(12) United States Patent
Nathan et al.

(10) Patent No.: US 8,479,240 B2
(45) Date of Patent: *Jul. 2, 2013

(54) REMOTE MANAGEMENT SYSTEM FOR AT LEAST ONE AUDIOVISUAL INFORMATION REPRODUCTION DEVICE

(75) Inventors: Guy Nathan, Nun's Island (CA); Tony Mastronardi, Pierrefonds (CA); Jean-Marc Bourdelais, Sainte-Sophie (CA)

(73) Assignee: TouchTunes Music Corporation, New York, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/151,771

(22) Filed: Jun. 2, 2011

(65) Prior Publication Data

US 2011/0298938 A1 Dec. 8, 2011

Related U.S. Application Data

(63) Continuation of application No. 09/584,797, filed on Jun. 1, 2000, now Pat. No. 7,996,873.

(30) Foreign Application Priority Data

Jul. 16, 1999 (FR) ...................................... 99 09225

(51) Int. Cl.
*H04N 7/173* (2011.01)
(52) U.S. Cl.
USPC ............... 725/91; 725/78; 725/100; 725/116; 725/139; 725/144
(58) Field of Classification Search
USPC ............... 725/80, 139, 141, 144, 91-93, 116, 725/146; 709/208
See application file for complete search history.

(56) References Cited

U.S. PATENT DOCUMENTS 3,807,541 A 4/1974 Kortenhaus
3,982,620 A 9/1976 Kotenhaus
(Continued)

FOREIGN PATENT DOCUMENTS

AU 199954012 4/2000
DE 3406058 8/1985
(Continued)

OTHER PUBLICATIONS

Bonczek et al, "The DSS Development System", 1983 National Computer Conference, Anaheim, California, May 16-19, 1983, pp. 441-455.

(Continued)

*Primary Examiner* — Kristine Kincaid
*Assistant Examiner* — Sumaiya A Chowdhury
(74) *Attorney, Agent, or Firm* — Nixon & Vanderhye PC

(57) ABSTRACT

Method for remote management of at least one audiovisual information reproduction device comprising a host server connected to each audiovisual information reproduction device, the host server comprising a database containing management information for each audiovisual information reproduction device, wherein the host server also comprises a site manager communicating with the database, and comprising a number of screens, at least one first screen comprising a menu displaying the list of audiovisual information reproduction systems, validating the choice of each audiovisual information reproduction device causing the display of a first series of screens that the operator can use to modify the operating parameters of at least one selected audiovisual information reproduction device and/or a second series of screens that the operator can use to order at least one song for downloading onto the audiovisual information reproduction systems from a chosen list of devices or to delete at least one song, and/or a third series of screens displaying information about the use of an audiovisual information reproduction device.

20 Claims, 24 Drawing Sheets

US 8,479,240 B2
Page 2

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A * | 8/1988 | Korn et al. ............... 369/30.4 |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A * | 10/1994 | Martin et al. ............... 700/234 |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |

| Patent | Date | Name |
|---|---|---|
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A * | 9/1999 | Miller et al. .................. 700/231 |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |

| | | | | | | |
|---|---|---|---|---|---|---|
| 6,002,720 | A | 12/1999 | Yurt | 6,384,737 B1 | 5/2002 | Hsu et al. |
| 6,005,599 | A | 12/1999 | Asai et al. | 6,393,584 B1 | 5/2002 | McLaren et al. |
| 6,008,735 | A | 12/1999 | Chiloyan et al. | 6,396,480 B1 | 5/2002 | Schindler et al. |
| 6,009,274 | A | 12/1999 | Fletcher | 6,397,189 B1 | 5/2002 | Martin et al. |
| 6,011,758 | A | 1/2000 | Dockes et al. | 6,407,987 B1 | 6/2002 | Abraham |
| 6,018,337 | A | 1/2000 | Peters | 6,408,435 B1 | 6/2002 | Sato |
| 6,018,726 | A | 1/2000 | Tsumura | 6,408,437 B1 | 6/2002 | Hendricks et al. |
| 6,023,705 | A | 2/2000 | Bellinger et al. | 6,421,651 B1 | 7/2002 | Tedesco et al. |
| 6,025,868 | A | 2/2000 | Russo | 6,425,125 B1 | 7/2002 | Fries et al. |
| 6,034,925 | A | 3/2000 | Wehmeyer | 6,430,537 B1 | 8/2002 | Tedesco et al. |
| 6,038,591 | A | 3/2000 | Wolfe et al. | 6,430,738 B1 | 8/2002 | Gross et al. |
| 6,040,829 | A | 3/2000 | Croy et al. | 6,434,678 B1 | 8/2002 | Menzel |
| 6,041,354 | A | 3/2000 | Biliris et al. | 6,438,450 B1 | 8/2002 | DiLorenzo |
| 6,049,891 | A | 4/2000 | Inamoto | 6,442,549 B1 | 8/2002 | Schneider |
| 6,054,987 | A | 4/2000 | Richardson | 6,446,130 B1 | 9/2002 | Grapes |
| 6,055,573 | A | 4/2000 | Gardenswartz et al. | 6,449,688 B1 | 9/2002 | Peters et al. |
| 6,057,874 | A | 5/2000 | Michaud | 6,470,496 B1 | 10/2002 | Kato et al. |
| 6,069,672 | A | 5/2000 | Claassen | 6,473,794 B1 | 10/2002 | Guheen et al. |
| 6,072,982 | A | 6/2000 | Haddad | 6,488,508 B2 | 12/2002 | Okamoto |
| 6,107,937 | A | 8/2000 | Hamada | 6,490,570 B1 | 12/2002 | Numaoka |
| 6,118,450 | A | 9/2000 | Proehl et al. | 6,493,871 B1 | 12/2002 | McGuire et al. |
| 6,124,804 | A | 9/2000 | Kitao et al. | 6,496,927 B1 * | 12/2002 | McGrane et al. ................. 713/1 |
| 6,131,088 | A | 10/2000 | Hill | 6,498,855 B1 | 12/2002 | Kokkosoulis et al. |
| 6,131,121 | A | 10/2000 | Mattaway et al. | 6,522,707 B1 | 2/2003 | Brandstetter et al. |
| 6,134,547 | A | 10/2000 | Huxley et al. | 6,535,911 B1 | 3/2003 | Miller et al. |
| 6,138,150 | A | 10/2000 | Nichols et al. | 6,538,558 B2 | 3/2003 | Sakazume et al. |
| 6,148,142 | A | 11/2000 | Anderson | 6,543,052 B1 | 4/2003 | Ogasawara |
| 6,151,077 | A | 11/2000 | Vogel et al. | 6,544,122 B2 | 4/2003 | Araki et al. |
| 6,151,634 | A | 11/2000 | Glaser | 6,549,719 B2 | 4/2003 | Mankovitz |
| 6,154,207 | A | 11/2000 | Farris et al. | 6,560,651 B2 | 5/2003 | Katz et al. |
| 6,157,935 | A | 12/2000 | Tran et al. | 6,570,507 B1 | 5/2003 | Lee et al. |
| 6,161,059 | A | 12/2000 | Tedesco et al. | 6,571,282 B1 | 5/2003 | Bowman-Amuah |
| 6,170,060 | B1 | 1/2001 | Mott et al. | 6,577,735 B1 | 6/2003 | Bharat |
| 6,173,172 | B1 | 1/2001 | Masuda et al. | 6,578,051 B1 | 6/2003 | Mastronardi et al. |
| 6,175,861 | B1 | 1/2001 | Williams, Jr. et al. | 6,587,403 B1 | 7/2003 | Keller et al. |
| 6,182,126 | B1 | 1/2001 | Nathan et al. | 6,590,838 B1 | 7/2003 | Gerlings et al. |
| 6,185,184 | B1 | 2/2001 | Mattaway et al. | 6,598,230 B1 | 7/2003 | Ballhorn |
| 6,185,619 | B1 | 2/2001 | Joffe et al. | 6,622,307 B1 | 9/2003 | Ho |
| 6,191,780 | B1 | 2/2001 | Martin et al. | 6,628,939 B2 | 9/2003 | Paulsen |
| 6,192,340 | B1 | 2/2001 | Abecassis | 6,629,318 B1 | 9/2003 | Radha et al. |
| 6,195,732 | B1 | 2/2001 | Adams et al. | 6,643,620 B1 | 11/2003 | Contolini et al. |
| 6,198,408 | B1 | 3/2001 | Cohen | 6,643,690 B2 | 11/2003 | Duursma et al. |
| 6,202,060 | B1 | 3/2001 | Tran | 6,654,801 B2 | 11/2003 | Mann et al. |
| 6,209,060 | B1 | 3/2001 | Machida | 6,658,090 B1 | 12/2003 | Harjunen et al. |
| 6,212,138 | B1 | 4/2001 | Kalis et al. | 6,662,231 B1 | 12/2003 | Drosset et al. |
| 6,216,175 | B1 | 4/2001 | Sliger et al. | 6,702,585 B2 | 3/2004 | Okamoto |
| 6,216,227 | B1 | 4/2001 | Goldstein et al. | 6,724,974 B2 | 4/2004 | Naruto et al. |
| 6,219,692 | B1 | 4/2001 | Stiles | 6,728,824 B1 | 4/2004 | Chen |
| 6,223,209 | B1 | 4/2001 | Watson | 6,728,956 B2 | 4/2004 | Ono |
| 6,226,412 | B1 | 5/2001 | Schwab | 6,728,966 B1 | 4/2004 | Arsenault et al. |
| 6,226,715 | B1 | 5/2001 | Van Der Wolf et al. | 6,744,882 B1 | 6/2004 | Gupta et al. |
| 6,240,550 | B1 | 5/2001 | Nathan et al. | 6,751,794 B1 | 6/2004 | McCaleb et al. |
| 6,243,725 | B1 | 6/2001 | Hempleman et al. | 6,755,744 B1 | 6/2004 | Nathan et al. |
| 6,247,022 | B1 | 6/2001 | Yankowski | 6,762,585 B2 | 7/2004 | Liao |
| 6,256,773 | B1 | 7/2001 | Bowman-Amuah | 6,789,215 B1 | 9/2004 | Rupp et al. |
| 6,262,569 | B1 | 7/2001 | Carr et al. | 6,816,578 B1 | 11/2004 | Kredo et al. |
| 6,280,327 | B1 | 8/2001 | Leifer et al. | 6,898,161 B1 | 5/2005 | Nathan |
| 6,282,709 | B1 | 8/2001 | Reha et al. | 6,904,592 B1 | 6/2005 | Johnson |
| 6,288,991 | B1 | 9/2001 | Kajiyama et al. | 6,920,614 B1 | 7/2005 | Schindler et al. |
| 6,289,382 | B1 | 9/2001 | Bowman-Amuah | 6,928,653 B1 | 8/2005 | Ellis et al. |
| 6,292,443 | B1 | 9/2001 | Awazu et al. | 6,934,700 B1 | 8/2005 | Ijdens et al. |
| 6,298,373 | B1 | 10/2001 | Burns et al. | 6,942,574 B1 | 9/2005 | LeMay et al. |
| 6,301,710 | B1 | 10/2001 | Fujiwara | 6,974,076 B1 | 12/2005 | Siegel |
| 6,302,793 | B1 | 10/2001 | Fertitta et al. | 7,024,485 B2 | 4/2006 | Dunning et al. |
| 6,308,204 | B1 | 10/2001 | Nathan et al. | 7,073,172 B2 | 7/2006 | Chamberlain |
| 6,311,214 | B1 | 10/2001 | Rhoads | 7,103,583 B1 | 9/2006 | Baum et al. |
| 6,315,572 | B1 | 11/2001 | Glaser | 7,107,109 B2 | 9/2006 | Nathan et al. |
| 6,323,911 | B1 | 11/2001 | Schein et al. | 7,111,129 B2 | 9/2006 | Percival |
| 6,332,025 | B2 | 12/2001 | Takahashi et al. | 7,114,013 B2 | 9/2006 | Bakke et al. |
| 6,336,219 | B1 | 1/2002 | Nathan | 7,124,194 B2 | 10/2006 | Nathan et al. |
| 6,341,166 | B1 | 1/2002 | Basel | 7,188,352 B2 | 3/2007 | Nathan et al. |
| 6,344,862 | B1 | 2/2002 | Williams et al. | 7,195,157 B2 | 3/2007 | Swartz et al. |
| 6,346,951 | B1 | 2/2002 | Mastronardi | 7,198,571 B2 | 4/2007 | LeMay et al. |
| 6,353,820 | B1 | 3/2002 | Edwards et al. | 7,205,471 B2 | 4/2007 | Looney et al. |
| 6,356,971 | B1 | 3/2002 | Katz et al. | 7,206,417 B2 | 4/2007 | Nathan |
| 6,359,616 | B1 | 3/2002 | Ogura et al. | 7,210,141 B1 | 4/2007 | Nathan et al. |
| 6,359,661 | B1 | 3/2002 | Nickum | 7,231,656 B1 | 6/2007 | Nathan |
| 6,370,580 | B2 | 4/2002 | Kriegsman | 7,237,198 B1 | 6/2007 | Chaney |
| 6,381,575 | B1 | 4/2002 | Martin et al. | 7,293,277 B1 | 11/2007 | Nathan |

| | | | | | | |
|---|---|---|---|---|---|---|
| 7,356,831 B2 | 4/2008 | Nathan | | 2008/0137849 A1 | 6/2008 | Nathan |
| 7,406,529 B2 | 7/2008 | Reed | | 2008/0155588 A1 | 6/2008 | Roberts et al. |
| 7,415,707 B2 | 8/2008 | Taguchi et al. | | 2008/0168807 A1 | 7/2008 | Dion et al. |
| 7,418,474 B2 | 8/2008 | Schwab | | 2008/0171594 A1 | 7/2008 | Fedesna et al. |
| 7,424,731 B1 | 9/2008 | Nathan et al. | | 2008/0195443 A1 | 8/2008 | Nathan et al. |
| 7,430,736 B2 | 9/2008 | Nguyen et al. | | 2008/0239887 A1 | 10/2008 | Tooker et al. |
| 7,433,832 B1 | 10/2008 | Bezos et al. | | 2009/0037969 A1 | 2/2009 | Nathan et al. |
| 7,448,057 B1 | 11/2008 | Nathan | | 2009/0070341 A1 | 3/2009 | Mastronardi et al. |
| 7,483,958 B1 | 1/2009 | Elabbady et al. | | 2009/0138111 A1 | 5/2009 | Mastronardi |
| 7,500,192 B2 | 3/2009 | Mastronardi | | 2009/0265734 A1 | 10/2009 | Dion et al. |
| 7,512,632 B2 | 3/2009 | Mastronardi et al. | | 2009/0282491 A1 | 11/2009 | Nathan |
| 7,519,442 B2 | 4/2009 | Nathan et al. | | 2010/0042505 A1 | 2/2010 | Straus |
| 7,533,182 B2 | 5/2009 | Wurtzel et al. | | 2010/0211818 A1 | 8/2010 | Nathan et al. |
| 7,549,919 B1 | 6/2009 | Nathan et al. | | 2010/0241259 A1 | 9/2010 | Nathan |
| 7,574,727 B2 | 8/2009 | Nathan et al. | | 2010/0269066 A1 | 10/2010 | Nathan |
| 7,647,613 B2 | 1/2010 | Drakoulis et al. | | 2010/0299232 A1 | 11/2010 | Nathan et al. |
| 7,657,910 B1 | 2/2010 | McAulay et al. | | 2011/0066943 A1 | 3/2011 | Brillon et al. |
| 7,749,083 B2 | 7/2010 | Nathan et al. | | FOREIGN PATENT DOCUMENTS | | |
| 7,757,264 B2 | 7/2010 | Nathan | | | | |
| 7,761,538 B2 | 7/2010 | Lin et al. | | DE | 3723737 | 1/1988 |
| 7,770,165 B2 | 8/2010 | Olson et al. | | DE | 3820835 | 1/1989 |
| 7,783,593 B2 | 8/2010 | Espino | | DE | 3815071 | 11/1989 |
| 7,783,774 B2 | 8/2010 | Nathan et al. | | DE | 4244198 | 6/1994 |
| 7,793,331 B2 | 9/2010 | Nathan et al. | | DE | 19610739 | 9/1997 |
| 7,822,687 B2 | 10/2010 | Brillon et al. | | DE | 19904007 | 8/2000 |
| 2001/0016815 A1 | 8/2001 | Takahashi et al. | | EP | 0082077 | 6/1983 |
| 2001/0023403 A1 | 9/2001 | Martin et al. | | EP | 0140593 | 5/1985 |
| 2001/0030660 A1 | 10/2001 | Zainoulline | | EP | 0256921 | 2/1988 |
| 2001/0037367 A1 | 11/2001 | Iyer | | EP | 0283304 | 9/1988 |
| 2001/0044725 A1 | 11/2001 | Matsuda et al. | | EP | 0283350 | 9/1988 |
| 2002/0002079 A1 | 1/2002 | Martin et al. | | EP | 0309298 | 3/1989 |
| 2002/0002483 A1 | 1/2002 | Siegel et al. | | EP | 0313359 | 4/1989 |
| 2002/0113824 A1 | 8/2002 | Myers | | EP | 0340787 | 11/1989 |
| 2002/0116476 A1 | 8/2002 | Eyal et al. | | EP | 0363186 | 4/1990 |
| 2002/0118949 A1 | 8/2002 | Jones et al. | | EP | 0425168 | 5/1991 |
| 2002/0120925 A1 | 8/2002 | Logan | | EP | 0464562 | 1/1992 |
| 2002/0126141 A1 | 9/2002 | Mastronardi | | EP | 0480558 | 4/1992 |
| 2002/0129036 A1 | 9/2002 | Ho Yuen Lok et al. | | EP | 0498130 | 8/1992 |
| 2002/0162104 A1 | 10/2002 | Raike et al. | | EP | 0507110 | 10/1992 |
| 2003/0005099 A1 | 1/2003 | Sven et al. | | EP | 0529834 | 3/1993 |
| 2003/0008703 A1 | 1/2003 | Gauselmann | | EP | 0538319 B1 | 4/1993 |
| 2003/0018740 A1 | 1/2003 | Sonoda et al. | | EP | 0631283 | 12/1994 |
| 2003/0031096 A1 | 2/2003 | Nathan et al. | | EP | 0632371 | 1/1995 |
| 2003/0041093 A1 | 2/2003 | Yamane et al. | | EP | 0711076 | 5/1996 |
| 2003/0065639 A1 | 4/2003 | Fiennes et al. | | EP | 0786122 B1 | 7/1997 |
| 2003/0088538 A1 | 5/2003 | Ballard | | EP | 0817103 | 1/1998 |
| 2003/0093790 A1 | 5/2003 | Logan et al. | | EP | 0841616 | 5/1998 |
| 2003/0101450 A1 | 5/2003 | Davidsson et al. | | EP | 0919964 | 6/1999 |
| 2003/0104865 A1 | 6/2003 | Itkis et al. | | EP | 0959570 | 11/1999 |
| 2003/0108164 A1 | 6/2003 | Laurin et al. | | EP | 0974896 | 1/2000 |
| 2003/0135424 A1 | 7/2003 | Davis et al. | | EP | 0974941 | 1/2000 |
| 2003/0208586 A1 | 11/2003 | Mastronardi et al. | | EP | 0982695 | 3/2000 |
| 2003/0225834 A1 | 12/2003 | Lee et al. | | EP | 1001391 | 5/2000 |
| 2004/0025185 A1 | 2/2004 | Goci et al. | | EP | 1170951 | 1/2002 |
| 2004/0085334 A1 | 5/2004 | Reaney | | EP | 1288802 | 3/2003 |
| 2004/0103150 A1 | 5/2004 | Ogdon et al. | | EP | 1408427 | 4/2004 |
| 2004/0204220 A1 | 10/2004 | Fried et al. | | EP | 1549919 | 4/2004 |
| 2004/0205171 A1 | 10/2004 | Nathan et al. | | FR | 2602352 | 2/1988 |
| 2004/0220926 A1 | 11/2004 | Lamkin et al. | | FR | 2808906 | 11/2001 |
| 2005/0060405 A1 | 3/2005 | Nathan et al. | | GB | 2122799 | 1/1984 |
| 2005/0073782 A1 | 4/2005 | Nathan | | GB | 2166328 | 4/1986 |
| 2005/0086172 A1 | 4/2005 | Stefik | | GB | 2170943 | 8/1986 |
| 2005/0125833 A1 | 6/2005 | Nathan et al. | | GB | 2193420 | 2/1988 |
| 2005/0267819 A1 | 12/2005 | Kaplan | | GB | 2238680 | 6/1991 |
| 2006/0018208 A1 | 1/2006 | Nathan et al. | | GB | 2254469 | 10/1992 |
| 2006/0035707 A1 | 2/2006 | Nguyen et al. | | GB | 2259398 | 3/1993 |
| 2006/0062094 A1 | 3/2006 | Nathan et al. | | GB | 2262170 | 6/1993 |
| 2006/0239131 A1 | 10/2006 | Nathan et al. | | GB | 2380377 | 4/2003 |
| 2006/0293773 A1 | 12/2006 | Nathan et al. | | JP | 57173207 | 10/1982 |
| 2007/0121430 A1 | 5/2007 | Nathan | | JP | 58-179892 | 10/1983 |
| 2007/0142022 A1 | 6/2007 | Madonna et al. | | JP | 60-253082 | 12/1985 |
| 2007/0160224 A1 | 7/2007 | Nathan | | JP | 61084143 | 4/1986 |
| 2007/0204263 A1 | 8/2007 | Nathan et al. | | JP | 62-192849 | 8/1987 |
| 2007/0209053 A1 | 9/2007 | Nathan | | JP | 62-284496 | 12/1987 |
| 2007/0247979 A1 | 10/2007 | Brillon et al. | | JP | 63-60634 | 3/1988 |
| 2008/0069545 A1 | 3/2008 | Nathan et al. | | JP | 2-153665 | 6/1990 |
| 2008/0077962 A1 | 3/2008 | Nathan | | JP | 5-74078 | 3/1993 |
| 2008/0086379 A1 | 4/2008 | Dion et al. | | JP | 5122282 | 5/1993 |
| 2008/0096659 A1 | 4/2008 | Kreloff et al. | | JP | 07281682 | 10/1995 |

| | | |
|---|---|---|
| JP | 8274812 | 10/1996 |
| JP | 08279235 | 10/1996 |
| JP | 9114470 | 5/1997 |
| JP | 9127964 | 5/1997 |
| JP | 10-098344 | 4/1998 |
| JP | 10222537 | 8/1998 |
| JP | 07504517 | 3/2007 |
| WO | WO 86/01326 | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 02/095752 | 11/2002 |
| WO | WO 03/069613 | 8/2003 |
| WO | WO 2004/029775 | 4/2004 |
| WO | WO 2006/014739 | 2/2006 |

OTHER PUBLICATIONS

Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Derfler et al., "How Networks Work", Millennium Ed., Que Corporation, Jan. 2000.
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
European Search Report from EP 1 993 079.
European Search Report issued for European Application No. 08000845.1-1238/1962251, dated Apr. 3, 2009.

Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
iTouch 8 Plus brochure, JVL Corporation, 2005, 2 pages.
iTouch 27 New Games brochure, JVL Corporation, 2005, 2 pages.
Koskelainem, "Report on Streamworks™".
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 Oct. 1 JP 07 281682, figure 1-6 abrége.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Strauss et al., "Information Jukebox a semi public device for presenting multimedia information content", Pers, Ubiquit Comput, 7, pp. 217-220, 2003.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).

* cited by examiner

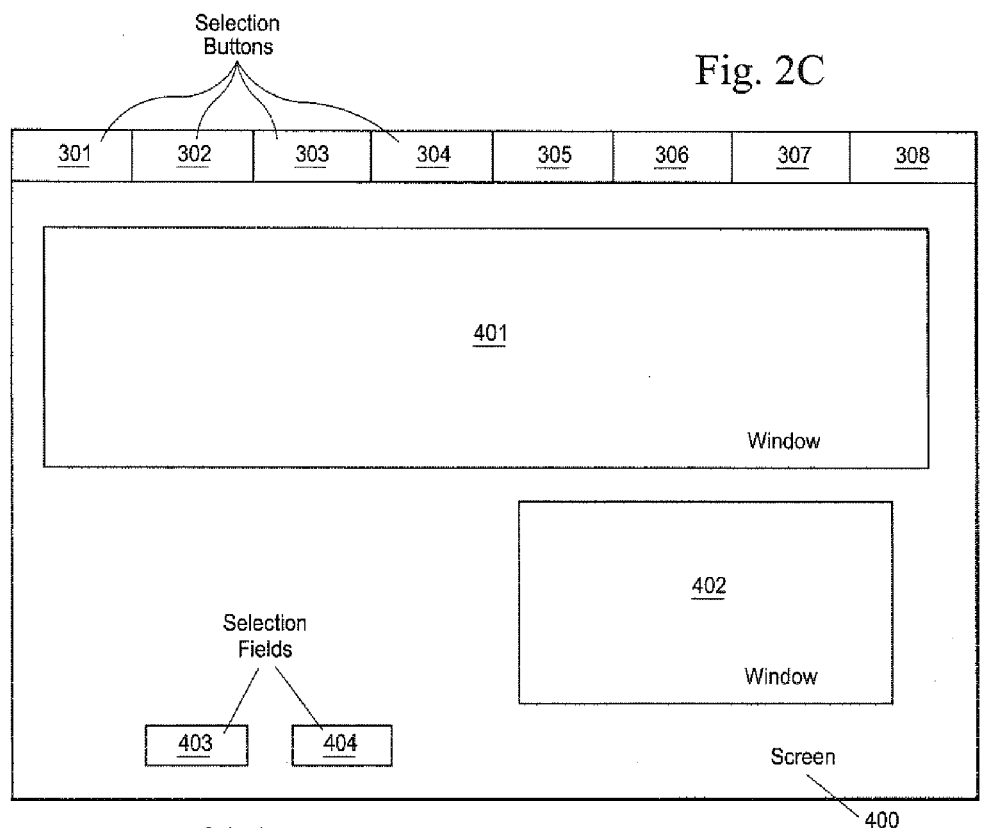
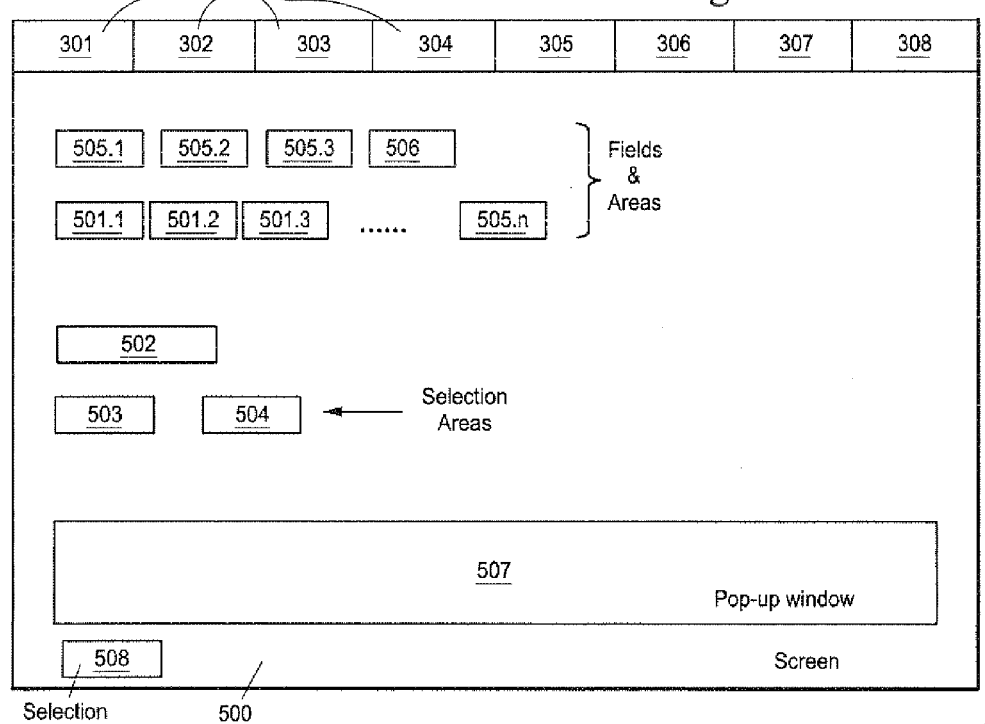

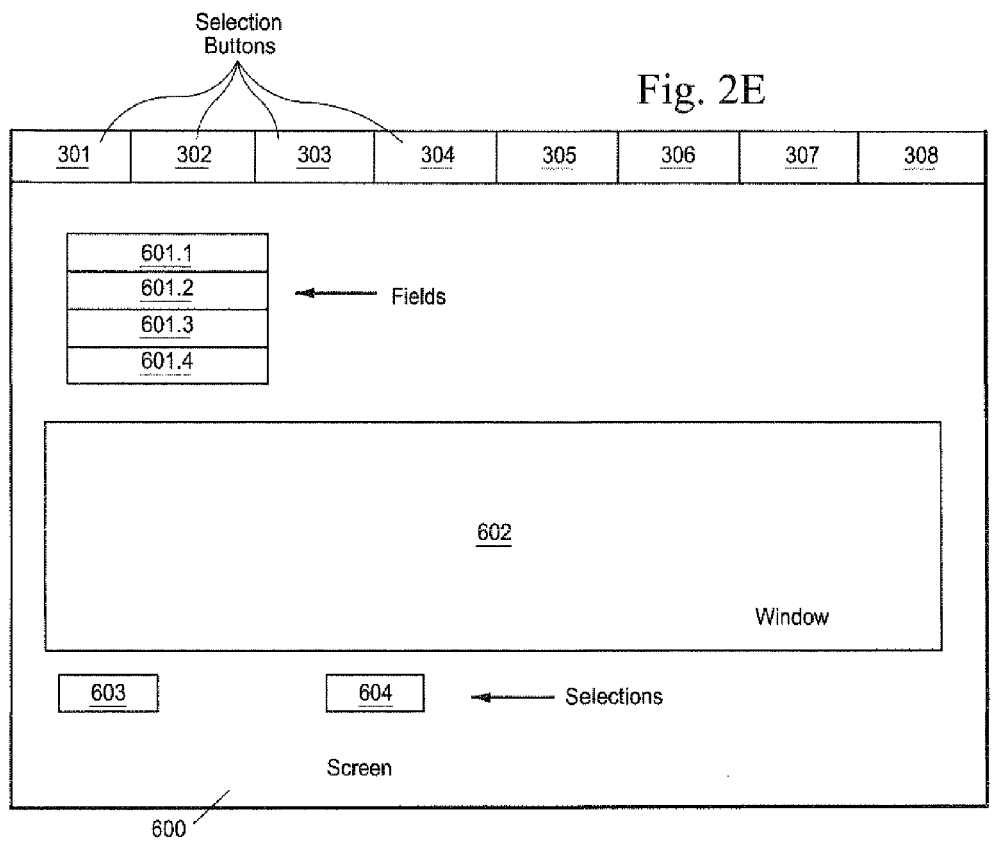
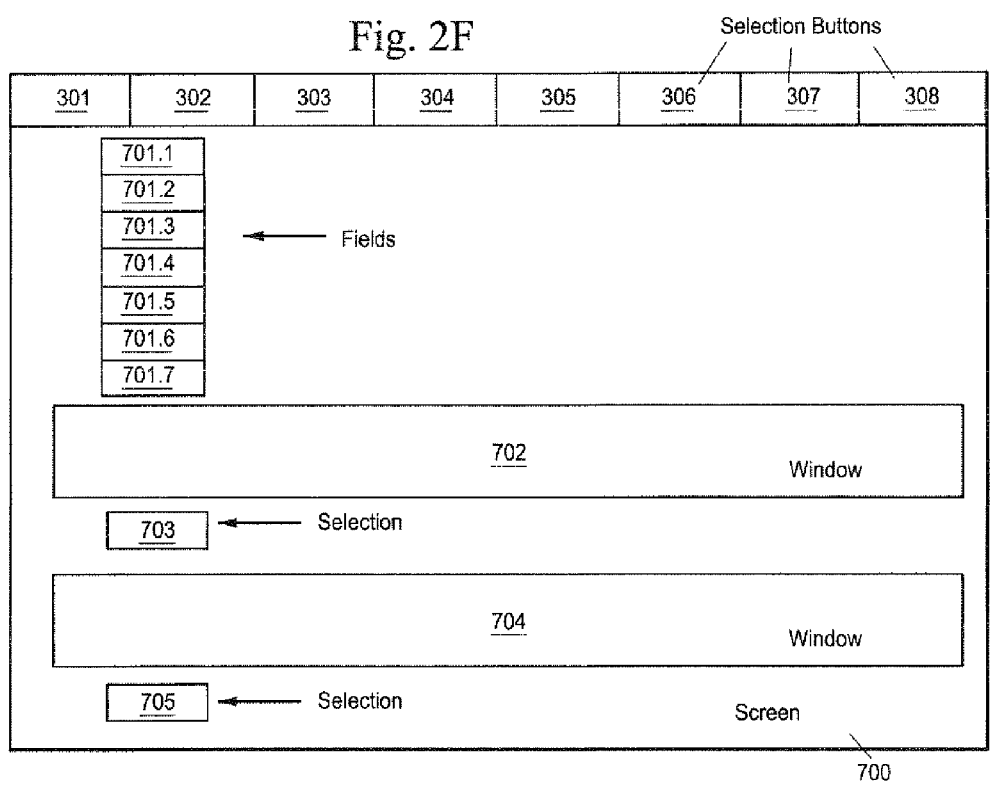

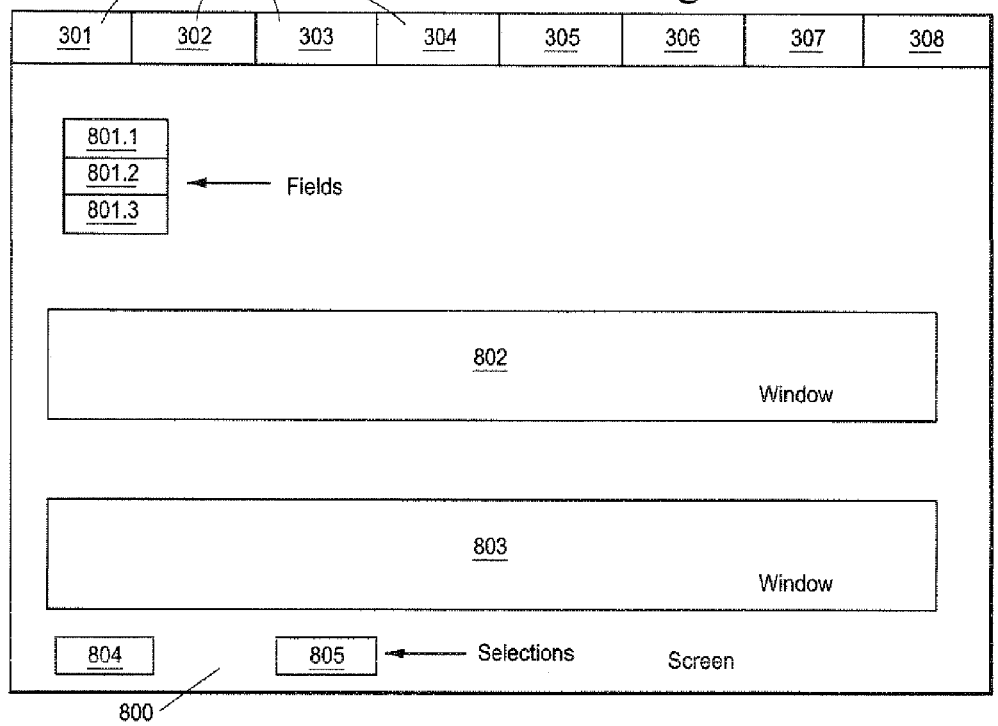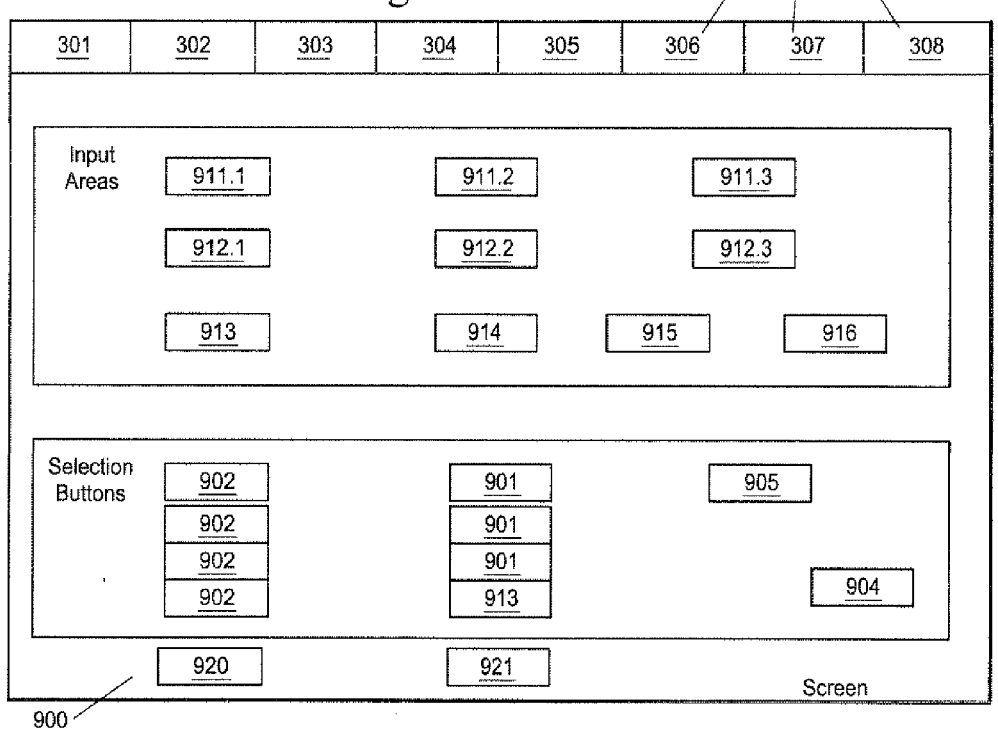

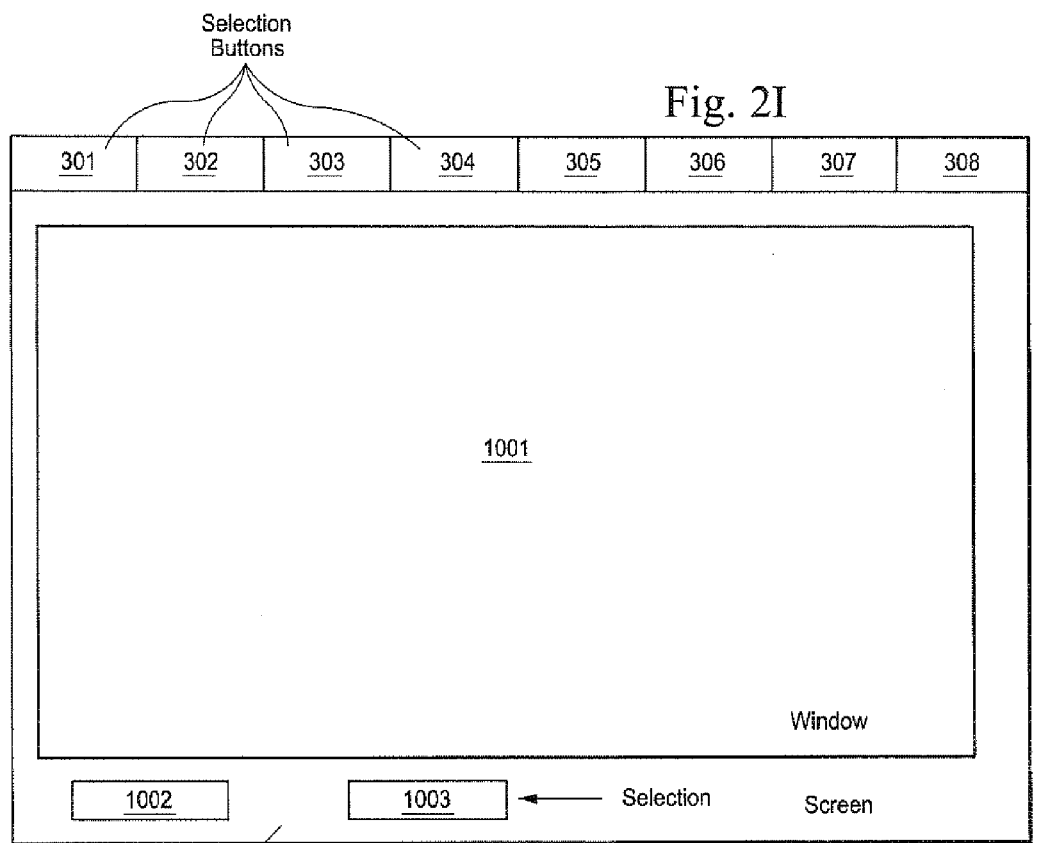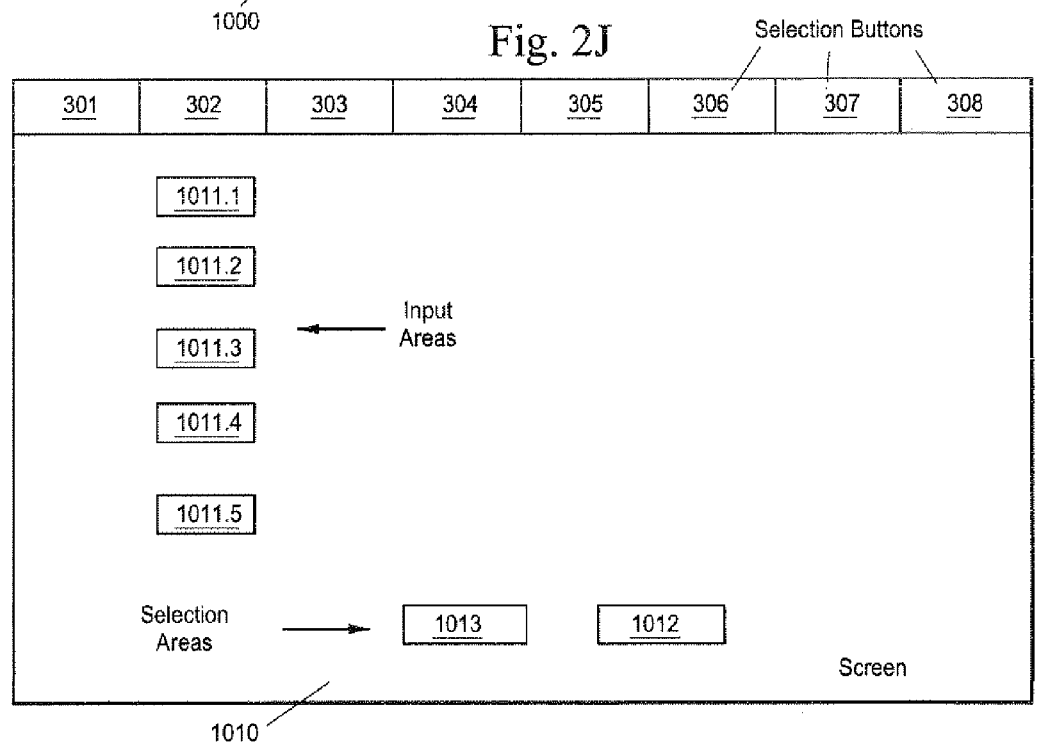

REMOTE MANAGEMENT SYSTEM FOR AT LEAST ONE AUDIOVISUAL INFORMATION REPRODUCTION DEVICE

CROSS REFERENCE TO RELATED APPLICATIONS

This Application is a Continuation of application Ser. No. 09/584,797 filed Jun. 1, 2000, now U.S. Pat. No. 7,996,873 which claims priority to French Application No. 99 09225 filed Jul. 16, 1999, the entire contents of which are hereby incorporated by reference herein.

FIELD OF THE INVENTION

This invention relates to a system for the management of at least one audiovisual information reproduction device.

BACKGROUND OF THE INVENTION

International Patent WO 96/12255 describes a device for reproduction of audiovisual information commonly called jukebox. This jukebox is organized around a system unit that manages audiovisual reproduction means and means for memorizing at least one audiovisual information corresponding to the soundtrack of a song. The system unit also manages telecommunication means such as a modem, particularly to enable downloading of audiovisual information from a host server. Management of orders for new songs and for changing settings requires either that an operator should visit the site on which the jukebox is installed, or that the operator should use a computer with a link to the host server. Furthermore, management operations that can be performed through the link with the host server are limited to ordering new musical selections.

OBJECTS AND SUMMARY OF THE INVENTION

Therefore, the purpose of this invention is to overcome the disadvantages of prior art by proposing a system for remote management of intelligent audiovisual information reproduction systems installed locally in order to limit travel necessary by the operator to carry out management and configuration operations.

This purpose is achieved by the fact that the system for remote management of an audiovisual information reproduction device comprises a host server connected to telecommunication means of each audiovisual information reproduction device, the host server comprising storage means capable of storing a database containing management information for each audiovisual information reproduction device, the set of available musical selections, the set of possible configurations for each audiovisual information reproduction device, the system being characterized in that the host server also comprises an "Internet" site manager communicating with the database, the "Internet" site being accessible by an operator responsible for the management of at least one audiovisual information reproduction device, and comprising a number of screens, at least a first screen comprising a popup menu displaying the list of audiovisual information reproduction systems installed locally for which usage information is available, the choice of at least one audiovisual information reproduction device being validated causing the display of a first series of screens that the operator can use to modify the operating parameters of each selected audiovisual information reproduction system and/or a second series of screens that the operator can use to order at least one song for downloading on each reproduction device in a chosen list of devices or to delete at least one song, and/or a third series of screens displaying information about the use of the audiovisual, information reproduction device.

According to another special feature, the "Internet" site manager collects information about the operation of each audiovisual information reproduction device displayed on each screen, and the list of available songs, in the database.

According to another special feature, modifications made by the operator in the first and/or second series of screens are stored in a file and are translated into the database language to update the data modified in these series of screens and update each audiovisual information reproduction device concerned by the modifications as soon as a communication is set up between the host server and each audiovisual information reproduction device.

According to another special feature, the "Internet" site manager comprises means of authentication of the operator designed to limit the operator's access to the audiovisual information reproduction devices that he manages.

According to another feature, the screens in the first and second series of screens comprise a toolbar with several selection buttons that display either a screen in the first or second series of screens, or validate operations performed on the screen being displayed.

According to another special feature, a first selection button in the toolbar initiates the display of a third screen comprising a first window displaying information about the location of the audiovisual information reproduction device chosen by the operator, and an input area to update the information displayed in the first window, if required.

According to another feature, a second toolbar selection button triggers the display of a fourth screen in the second series of screens comprising several input areas that will be used to define selection criteria for selecting songs, the list of songs corresponding to the selection criterion being initially collected in the database by the site manager sending a request containing the criteria chosen by the operator in the input fields, and secondly displayed in a popup window in the fourth screen.

According to another special feature, validating the choice of a song selected in the popup window in the fourth screen triggers the display of a fifth screen comprising several fields containing elements identifying the selected song, a popup window displaying the list of audiovisual information reproduction devices managed by the operator, a first selection screen validating the purchase of the selected song for the audiovisual information reproduction devices selected by the operator in the popup window, by sending a request to the site manager, and a second selection area displaying the fourth screen again.

According to another feature, a third selection button on the toolbar triggers the display of a sixth screen comprising a number of fields containing information about the use of the audiovisual information reproduction device chosen by the operator, a first popup window containing the list of songs to be downloaded to the audiovisual information reproduction device chosen by the operator, a second popup window containing the list of songs to be deleted from this audiovisual information reproduction device, a first selection area triggering cancellation of downloading of one or several songs previously selected by the operator in the first popup window, and a second selection area triggering cancellation of the deletion of one or several songs previously selected by the operator in the second popup window.

According to another feature, a fourth toolbar selection button triggers the display of a seventh screen comprising several fields containing information about statistics on the use of the information reproduction device chosen by the operator, a first popup window containing the list of most frequently played songs, a second popup window containing the list of least frequently played songs on the audiovisual information reproduction device chosen by the operator, the seventh screen also comprising a selection area that triggers deletion of the song(s) selected by the operator in the second popup window.

According to another feature, a fifth selection button on the toolbar triggers the display of an eighth screen comprising a first series of input areas that the operator can use to choose a price for each area and a second series of input areas that the operator can use to choose the number of possible selections after paying the price, for each price.

According to another feature, the eighth screen comprises several input fields used to choose, select or input the parameters required to adjust audio reproduction means of the audiovisual information reproduction device chosen by the operator.

According to another feature, a sixth toolbar selection button triggers the display of a ninth screen comprising a window displaying all modifications made by the operator at the time of his connection to the Internet site managed by the site manager, a first selection area triggering validation of all operations displayed in the first window, and a second selection area canceling all these modifications.

According to another feature, a seventh selection button triggers the display of a tenth screen comprising at least one selection area that can be used to activate or deactivate a particular function of the audiovisual information reproduction device.

According to another feature, an eighth button in the toolbar triggers the display of a screen that will be used to define a default basic configuration of all or some of the audiovisual information reproduction devices managed by the operator.

According to another feature, the second series of screens includes a screen containing a first menu in which the song category required by the operator is selected, a second menu in which the style of the song required by the operator is selected, and a selection area in which the operator validates his choice to trigger the display of a second screen comprising a first window displaying the list of songs in the first category and style chosen by the operator, and a second window displaying the list of songs selected by the operator in the list in the first window and a selection area in which the operator validates his choice.

According to another feature, the list of displayed songs is collected in the database among the most frequently played songs on all the operator's jukeboxes or among the songs most frequently played on all jukeboxes managed by the server or among the songs most frequently played on all jukeboxes installed in all branches belonging to the same determined category.

According to another feature, the second window also comprises the list of songs already memorized on the audiovisual information reproduction device.

According to another feature, the third series of screens comprises at least one screen comprising a window displaying the list of songs played by the audiovisual information reproduction device, and the date on which each song was played, and/or at least one screen comprising a window indicating the date(s) on which the audiovisual information reproduction device was switched off and/or on, and a window indicating the date(s) on which a communication between the audiovisual information reproduction device and the host server was interrupted.

According to another feature, the system comprises a magnetic or optical recording system such that the songs selected by the operator are recorded on a portable magnetic or optical medium, or a solid state electronic memory, preferably semiconductor based.

According to another feature, songs are encrypted and recorded on a portable magnetic or optical medium in a compressed format, the songs only being decompressed and decrypted when the song is played on an audiovisual information reproduction device.

BRIEF DESCRIPTION OF DRAWINGS

Other features and advantages of this invention will become more obvious after reading the following description with reference to the attached drawings in which:

FIGS. 2A to 2J show examples of screens on the "Internet" site,

DESCRIPTION OF THE PREFERRED EMBODIMENTS

Before describing details of the remote management system for an audiovisual reproduction device according to the invention, it is worth mentioning the composition of an audiovisual reproduction device and its operating mode.

Figure 3:
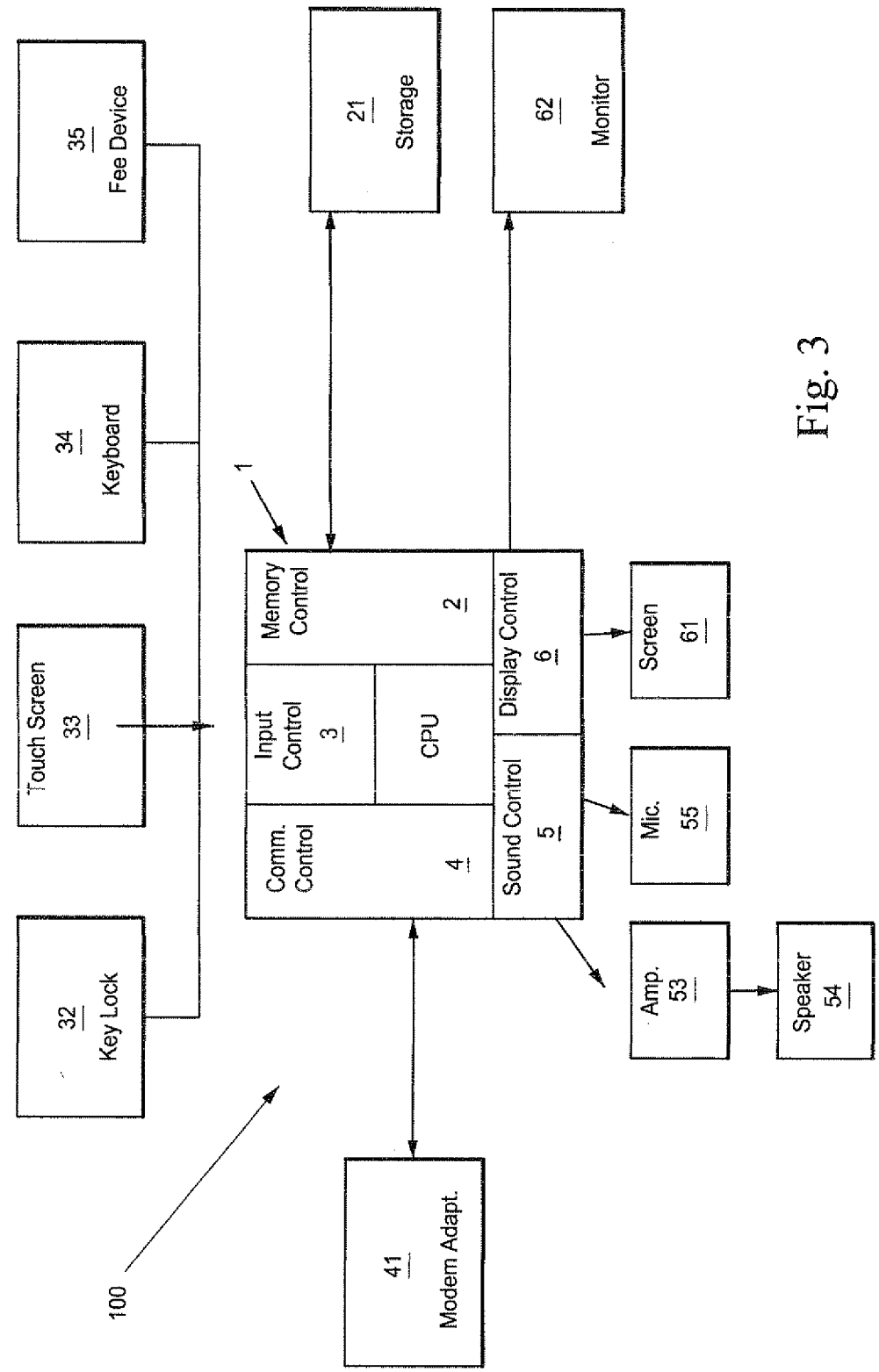
FIG. 3 shows an example of an audiovisual reproduction device.

FIG. 3 shows an example of an audiovisual information reproduction device. This type of device is described in particular in international patent application WO 96/12255 submitted by the applicant. Preferably, but in no way restrictively, this audiovisual information reproduction device uses the hardware components mentioned and referenced below.

The system unit 1 with a microprocessor is a high performance PC compatible system, the choice at the time of implementation was made for an Intel Pentium type system with at least the following memory means and characteristics:
compatibility with the Vesa local bus,
processor cache memory: 256 kbytes,
RAM memory: 32 Mbytes,
high performance serial and parallel ports,
microprocessor controlled SVGA type graphic adapter,
SCSI/2 type bus controller,
self-powered static RAM memory.

Any other system unit with equivalent or better performances could be used in the invention.

This system unit controls and manages a sound control circuit 5, a telecommunications control circuit 4, an input control circuit 3, a mass memory control circuit 2, and a display means control circuit 6. The display means are composed primarily of a SVGA type flat screen, high resolution, low radiation video monitor 62 with no interlacing. This is the monitor that will be used for image reproduction (for example album covers for musical selections), and to display graphics and video clips.

Storage modules 21 using high speed, high capacity SCSI type hard disks form part of the memory means and are associated with the memory means already existing in the microprocessor device. These modules are used for the storage of audiovisual information.

A 28.8 kbps high speed telecommunications modem adapter 41 is included to create the link with an audiovisual information distribution network controlled by a host server.

For the reproduction of audio information in musical selections, the system comprises loudspeakers 54 into which the signal from an amplifier tuner 53 connected to a music synthesizer type electronic circuit 5 is input, designed to accept a large number of input sources while providing a CD (compact disk) type quality, for example such as the microprocessor multimedia audio adapter such as a sound card.

The audiovisual reproduction device is provided with an input controller circuit 3 that manages a touch screen including a glass coating panel using the "advanced surface wave technology", and an AT type bus controller. This touch screen can be used to select various selection information used by customers, and ordering and management control information used by the system manager or owner, on the video monitor display 62 or on a television screen 61. It is also used with an external keyboard 34 that can be connected to the system that is provided with a keyboard connector for this purpose, controlled by a key lock 32 through the interface circuit 3, for maintenance purposes.

A fee payment device 35 is also connected to the input interface circuit 3. Any other device can be used that enables reception of any payment method by coins, tickets, tokens, smart cards or a combination of payment means.

The system is installed in a steel frame or rack.

Apart from these elements, a cordless microphone 55 is connected to the audio controller 5, to transform the audio controller into a powerful public address and public information system, and possibly a karaoke machine. The system can use a system of cordless loudspeakers.

The operating software in the device was generated around a library of tools and services specifically designed for the audiovisual field in a multimedia universe. This library advantageously includes a high performance multi-task operating system that efficiently enables simultaneous execution of multiple code fragments. This operating software enables concurrent and orderly execution, thus avoiding any conflict between operations carried out on display means, audio reproduction means and management of telecommunication links through the distribution network. Furthermore, this software is extremely flexible.

The operating system is shared into modules comprising a first starter module 7 itself sub-divided into a first main program module 70 "JUK.EXE" that verifies the memory and verifies if the minimum number of objects necessary to enable operation of each of the audiovisual information reproduction devices (100.1 to 100.*n*) is present; a second module 71 dynamically linked to it and dependent on it consists of the "JUKECORE.DLL" module. The function of this second module 71 is to contain C language libraries and to perform the main task.

The architecture of the operating system comprises a distribution of the different tasks into software modules connected to each other by dynamic links or composed of executable subprograms presenting main dependency links with other parts of the operating system. Each of the modules is composed of object files or dynamic link libraries organized according to a number of dependency levels described in the attributes. The attributes of an object or a library indicate the version number and dependencies of the object file or the library with respect to other object files as described below for the PARSER module. Each attribute indicates the level assigned to the module. Thus, the JUK.EXE 70 module is a higher level than the JUKECORE 71, TLS 72, CRDE 73, GFX 74, WDLL 75, JEEP 9 and TELECOM 10 modules, but the TELECOM 10 module depends on the JEEP module 9 (see link 910 and it is therefore at a lower level than JEEP 9.

Similarly, the level of JEEP 9 (see link 759) is lower than the level of the WDLL module 75 since it is dependent on it and TLS (link 725) is a higher level than WDLL 75. On the other hand, TLS and GFX may be at the same level. The main task comprises a module (JUKECORE) designed to initialize or load the module 73, the program core "CRDE.DLL", initialize or load the graphic management module (GFX) 74, initialize or load the library loading module (WDLL.DLL) 75, load the telecommunication tasks Telecom module (DLL) 10, load the TLS.DLL module 72 that contains all usages necessary for the audiovisual information reproduction device (100.1 to 100.*n*), for telecom, time, decryption, etc., initialize or load the library of JEEP (Juke Execution Exchange Protocol) programs performing integrity server and loading request tasks and the dialog with the server, and starting the program (80, SILOAD.DLL) as the main task. The main jukebox application task comprises a module (SILOAD.DLL) containing the loader program library designed to verify the required dynamic link library versions in (WDLL), to load them or call the Telecom tasks module to perform the file transfer. The WDLL.DLL module comprises the list of the minimum versions necessary for operation in a (DLL.DEFAULT) file, and the list of all functions represented either by libraries (LIBRARY) (DLL, DJL), or by object files (DJO). Each object or library contains the list of all functions that the library or the object needs, and version numbers and dependencies. The WDLL module manages all new modules, controls inter-dependencies and checks that downloaded modules do not have any other dependencies and have been loaded with the necessary versions. The application part 8 specific to an audiovisual information reproduction device (100.1 to 100.*n*) comprises a number of modules loaded and run by SILOAD and defining the following display windows:

- a mouse signal or touch screen signal processing module 81,
- a module 82 for the processing of messages exchanged between objects and various other modules,
- a disk files management module FIL.DJL 83,
- a disk files read-write module FILIO.DJL 84,
- a module JSTRUCT.DJL 85 for supervision of all events generated by equipment such as the touch screen, the sound card, the coin collection equipment processing interface.

SILOAD manages loading of modules specific to the terminal task, namely all previously enumerated DJL modules and jukebox library modules 87 built up using WOBJECT 870 that manages the object such as the mixer, purchases; the WCURSOR module 871 that manages cursor movements; the DBMAPI module 872 that manages the database; the WFONTS module 873 that manages all font types; the PARSER module 874 (syntax analysis program) that analyzes and generates screens starting from the script and verifies the grammar using the "GRAMMAR.DJL" module 876 and the "LEXY.DJL" module 875 that is the lexical word functions assignment module inside the language. The PARSER module 874 contains the following information in its file header:

char*parser_version_info=DLL_INFO DJL;"
 DLL-NAME PARSER.DJL;"
 "VERSION 1"

"CREATOR KENDALF;"
"REQUIRES lexyy.djl;4;"
"REQUIRES grammar-.djl;5";

All modules and all libraries (DJO, DLL, DJL) contain information similar to the information in the PARSER module and this information determines version and dependence needs.

Figure 4:
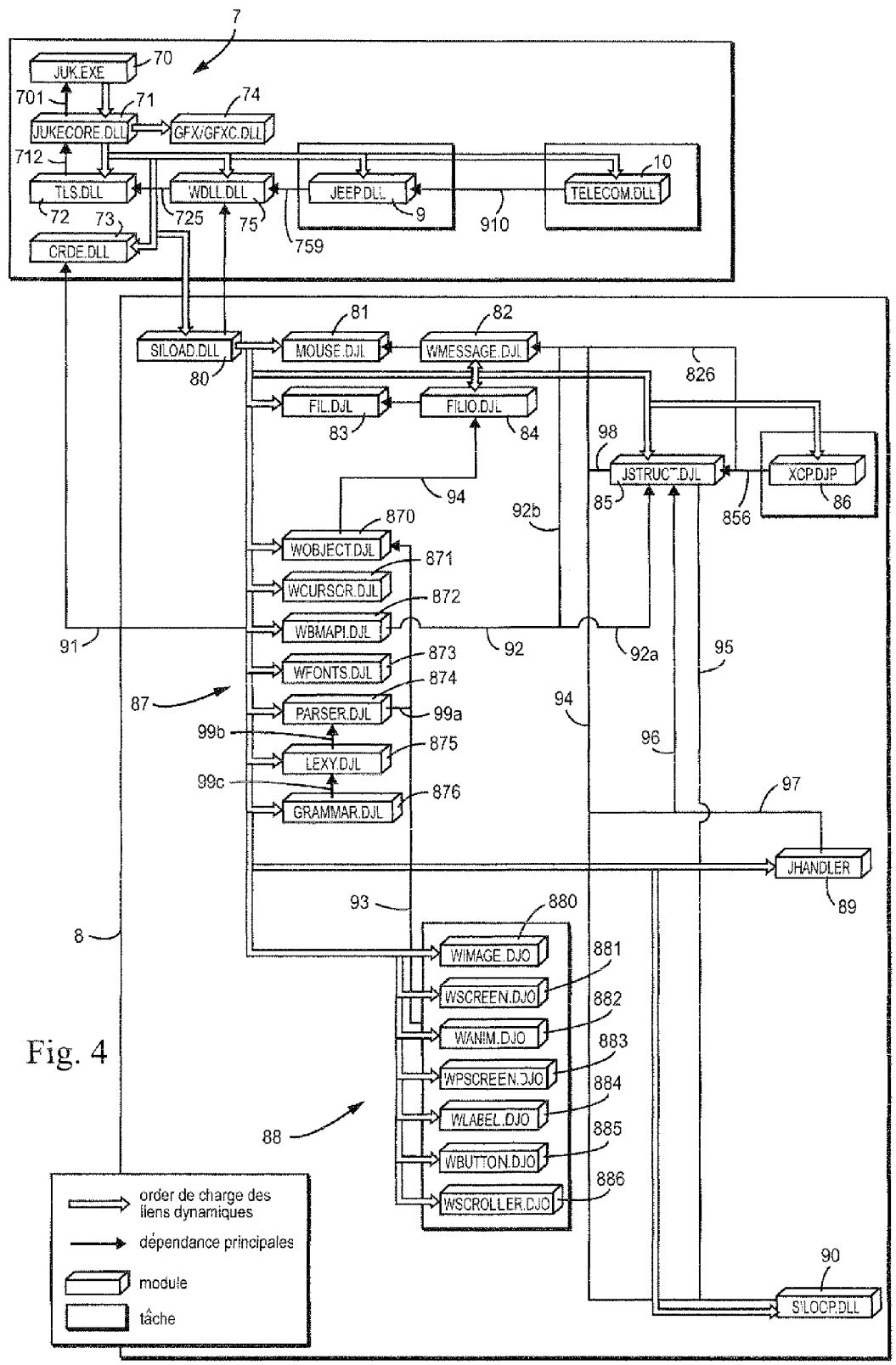
FIG. 4 shows an example logic diagram showing the relations between library modules and object modules in the operating system of the audiovisual reproduction device.
Figure 5:
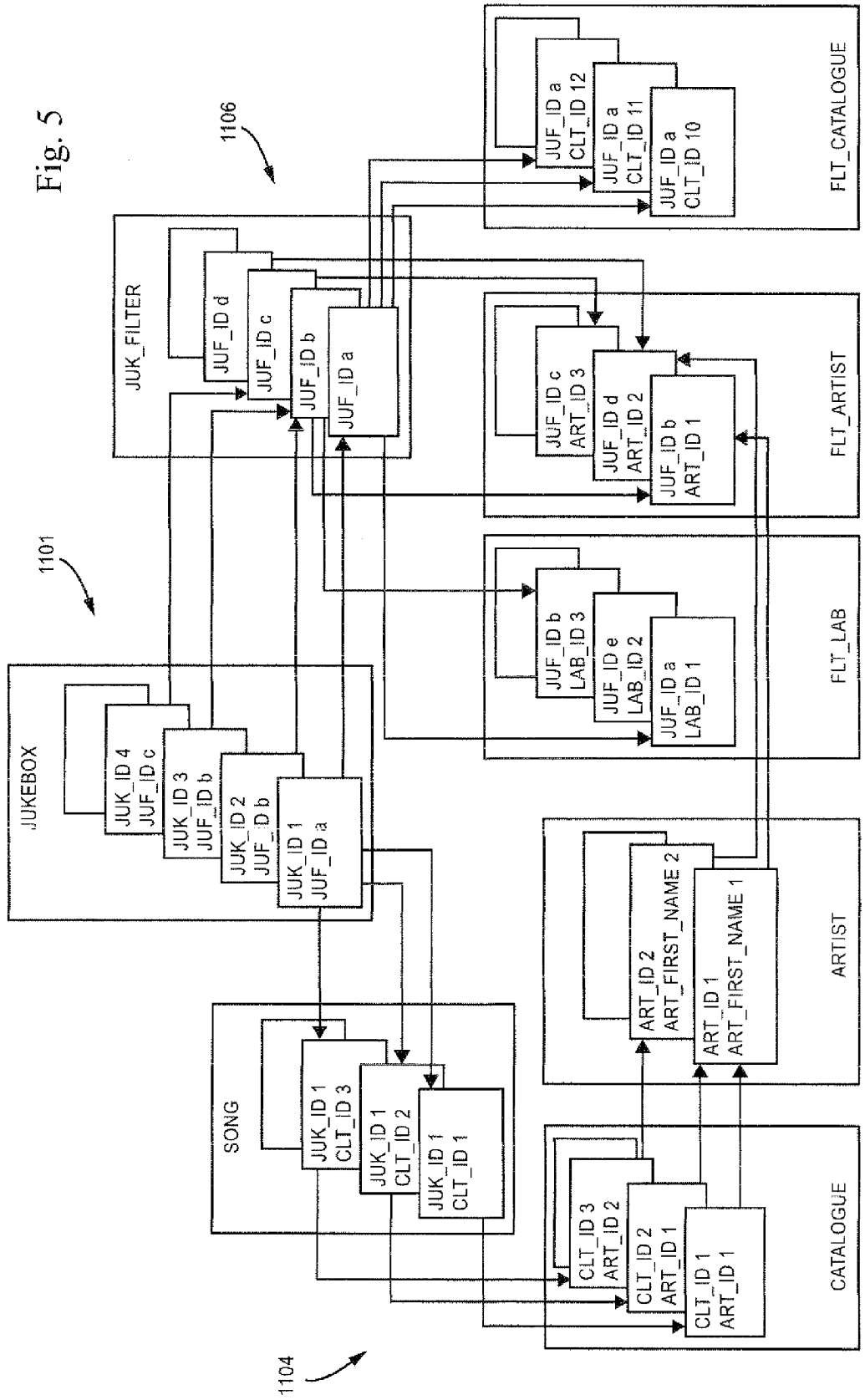
FIG. 5 shows a simplified flow chart of the structure of a database used by the system according to the invention.

Thus, the PARSER module needs LEXY version 4 and GRAMMAR version 5 modules otherwise it cannot be executed by the system. The double arrows between the different modules in FIG. 4 show the order of loading the different files. Thus, as seen above, the first step is to load JUKE.EXE followed by JUKECORE.DLL, so that GFX.DLL, TLS.DLL, WDLL.DLL, JEEP.DLL, TELECOM.DLL, CRDE.DLL and SILOAD.DLL can be loaded from JUKECORE.DLL.

The single arrows show dependencies between files. Thus, the arrow 91 indicates that DJL files, and DBMAPI in particularly, are dependent on CRDE.DLL. The arrow 93 shows that DJO files are dependent on the WOBJECT.DJL module. The WOBJECT.DJL module itself is dependent on the FILIO.DJL module. The arrow 92*a* indicates that DBMAPI.DJL is dependent on JSTRUCT.DJL and arrow 92*b* indicates that DBMAPI.DJL is dependent on WMESSAGE.DJL. The arrow 98 indicates that JSTRUCT.DJL is dependent on the WMESSAGE.DJL file. WMESSAGE is dependent on the MOUSE.DJL file and FILIO.DJL is dependent on the FIL.DJL file. The XCP.DJL file is dependent on JSTRUCT.DJL as shown by arrow 856 and on WMESSAGE.DJL as shown by arrow 826. The JHANDLER file is dependent on WMESSAGE.DJL as shown by arrow 97 and on JSTRUCT.DJL as shown by arrow 96. SILOOP.DLL file is dependent on JSTRUCT.DJL as shown by arrow 95, and on WMESSAGE.DJL as shown by arrow 94. TELECOM.DLL file is dependent on JEEP.DLL as shown by arrow 910, and JEEP.DLL is dependent on WDLL.DLL as shown by arrow 959. File WDLL.DLL is dependent on TLS.DLL as shown by arrow 725. Similarly, arrow 89*c* shows that GRAMMAR.DJL is dependent on LEXY.DLL, and arrow 99*b* shows that LEXY.DJL is dependent on PARSER.DJLL. Thus, as was seen previously, PARSER needs LEXY and GRAMMAR to execute and version 1 of PARSER uses version 4 of LEXY.DJL and version 5 of GRAMMAR.DJL. Similarly, WOBJECT.DJL is dependent on PARSER.DJL as shown by arrow 99*a*. Thus, all modules and all .DJO, .DLL and .DJL libraries contain information similar to that in the PARSER module that defines the version requirements of the different modules on which a given module is dependent. This information also gives module dependencies on other modules as shown by the arrows in FIG. 4.

The SILOAD library loading module also loads or runs a SILOOP.DLL module 90 that is a wait for event loop. A set of modules 88 contains the list of files that are to be included to manage the windows of a window display on the jukebox type terminal monitor.

This list of objects is composed of:
a "WPSCREEN.DJO" objects file 883 that defines the main page on the monitor,
a "WSCREEN" objects file 881 that is used to determine the number of screens available and thus displays several windows or screens on this main page,
a "WIMAGE.DJO" objects file 880 that determines and defines the image that it will use in the screen,
a "WANIM.DJO" objects file 882 that defines the animation when the image is animated,
a "WBUTTON.DJO" objects file 885 that defines and manages buttons that are used on the main page screen such as the control buttons used in the graphic interface defined in patent application PCT WO 96/12258,
a "WLABEL.DJO" objects file 884 that creates labels used to write on an object; and
a "WSCROLLER.DJO" objects file 886 that defines vertically scrolling display areas.

A "JHANDLER" library is used to define fixed uses of screens and therefore to determine which interfaces provide the link with the different objects defined by the previous modules.

Module 86 in the "XCP" library is used to manage payment tasks such as bank note reception systems or coin or smart card payment devices, and also to save basic information in the IBUTTON which is an integrated circuit for the storage of the user's secret codes.

Figure 1:
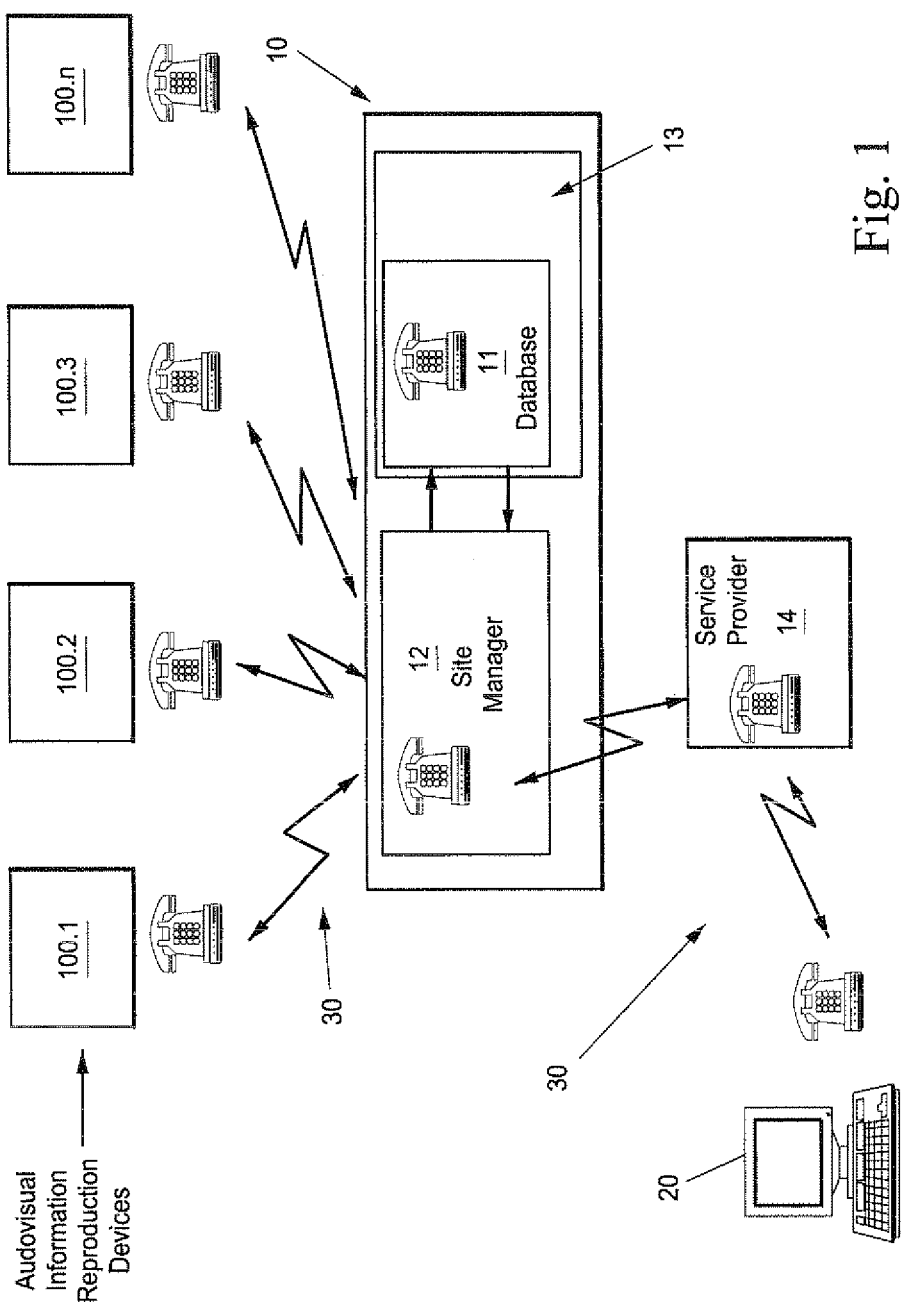
FIG. 1 shows a block diagram of the system according to the invention.

FIG. 1 shows a block diagram of the system according to the invention. According to prior art, each audiovisual reproduction device (100.1 to 100.*n*) communicates with the host server 10 through its telecommunication means, and for example a modem connected to the telephone network 30. The host server 10 comprises communication means 121, 111 for this purpose, for example such as at least one modem connected to the telephone network. The host server 10 also comprises a database 11 containing all information about the operation of each audiovisual information reproduction device (100.1 to 100.*n*), in other words the operating parameters for the audiovisual information reproduction device (100.1 to 100.*n*), its identification number, the list of songs stored on the audiovisual information reproduction device (100.1 to 100.*n*), and the operator responsible for management of the audiovisual reproduction device(s) (100.1 to 100.*n*). The database also contains statistics about the use of each audiovisual information reproduction device (100.1 to 100.*n*), in other words the list of songs played and the date on which each song was played, the list and date of all incidents that occurred during the use of each audiovisual information reproduction device (100.1 to 100.*n*), particularly when it was switched on, communication interruptions, and the number of times that payment means refused the money input. Similarly, the database comprises the list of available songs stored in the host server memory means 10, the audiovisual information necessary for reproduction of these songs, and the configuration tools necessary to install the operating system for each audiovisual information reproduction device (100.1 to 100.*n*). All the information contained in the database 11 is updated by means of communications, for example periodic communications, with each audiovisual information reproduction device (100.1 to 100.*n*) through the telephone network and modems for each audiovisual information reproduction device (100.1 to 100.*n*) and the database or the host server 10.

An example database 11 used in the management system according to the invention will now be described with reference to FIGS. 5 and 6A to 6F. All this information in the database 11 is stored in the form of arrays. Each array contains information about a theme or structure or particular function of the audiovisual information reproduction devices (100.1 to 100.*n*, FIG. 1). Each item of information is identified by an argument contained in an array in the database 11. The information in one array may be linked to another array. This link is established when at least one argument is common to the two arrays.

According to the invention, the database 11 comprises at least one first set of arrays (1101, FIGS. 5 and 6A and 6E) representing information directly concerning the audiovisual information reproduction device (100.1 to 100.*n*, FIG. 1), for example such as its operating status (JUK_STATUS, FIG.

Figures 1, 6A:
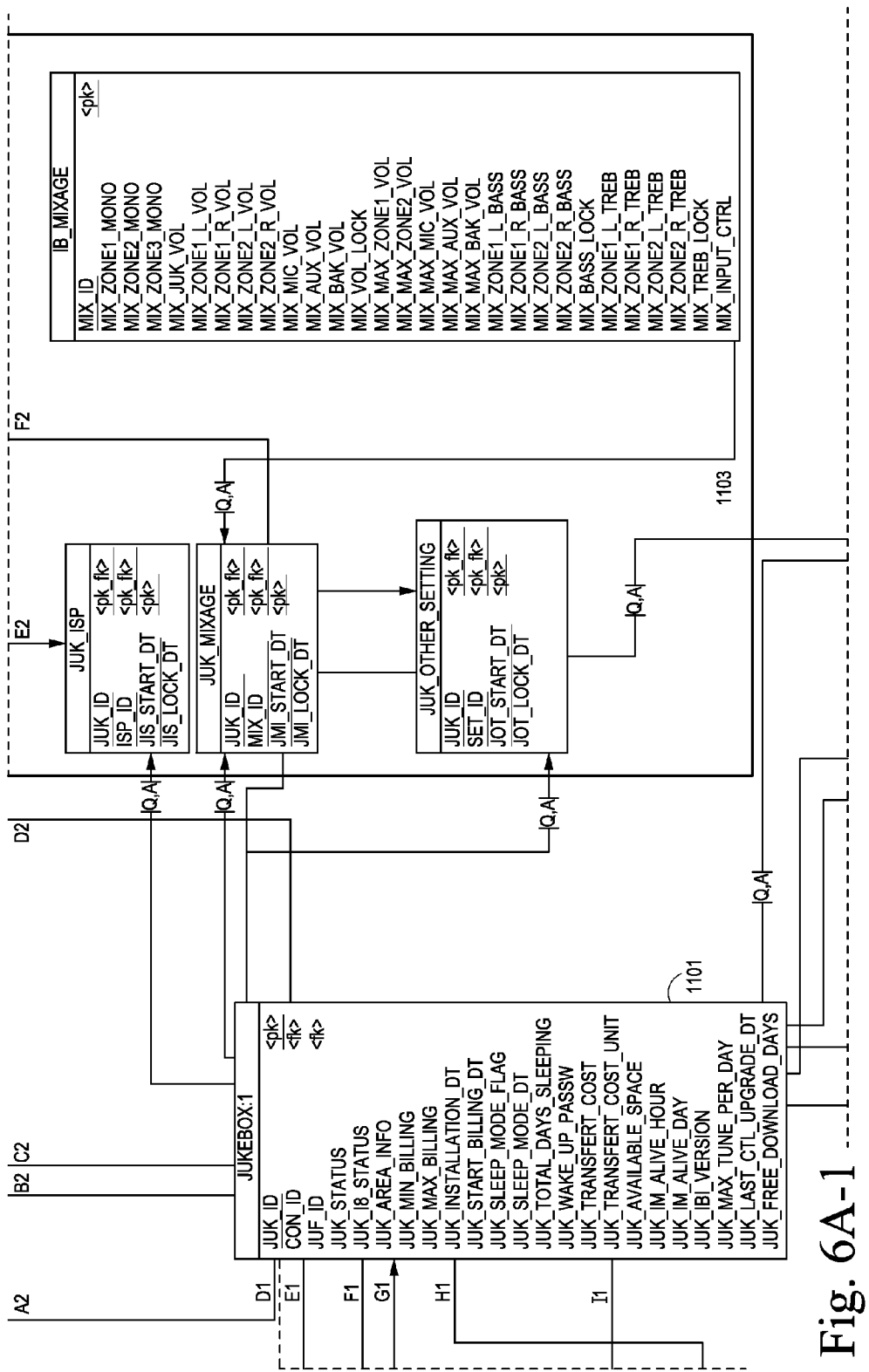
FIGS. 6A to 6F show a detailed flow chart of the structure of a database used by the system according to the invention.

6A) or its identification number (JUK_ID, FIG. 6A), or the available memory space (JUK_AVAILABLE_SPACE, FIG. 6A). Each row in an array (1101) represents information about an audiovisual information reproduction device (100.1 to 100.*n*, FIG. 1) identified in this array by its identification number (JUK-ID, FIG. 6A).

This first set of arrays 1101 is related to at least one second set of arrays (1102, FIGS. 5 and 6B and 6D) representing information about hardware and software constituents that can be recentered on an audiovisual information reproduction device (100.1 to 100.*n*, FIG. 1). This or these second array(s) (1102, FIGS. 5 and 6C and 6D) comprise in particular the name (PGD_NAME, FIG. 6D) in the program definition tables (PROGRM_DEF, FIG. 6D), or the name (COD_ID, FIG. 6B), the version (PGM_VERSION, FIG. 6B) and the installation date (PGM_RELEASE_DT, FIG. 6B) of each software or hardware component, in the component table (COMPONENT, FIG. 6A), the component definition table (COMPONENT_DEF, FIG. 6B), the component upgrade table (COMPONENT_UPGRADE, FIG. 6B), and the equipment table (FIRMWARE, FIG. 6B). Each table in the second arrays (1102, FIG. 6B) corresponds to a software component or a hardware component. The link between at least one table in a second set of arrays (1102, FIG. 6A) and the first set of arrays (1101, FIGS. 5 and 6A) is made using the number of the audiovisual information reproduction device (100.1 to 100.*n*, FIG. 1). Thus using this link, it is possible to know all software and hardware components of an audiovisual information reproduction device (100.1 to 100.*n*, FIG. 1) with a given number by searching in each second set of arrays for the tables containing the audiovisual information reproduction device number (100.1 to 100.*n*, FIG. 1).

The first set of arrays (1101, FIGS. 5, 6A and 6C) is also related to a third set of arrays (1103, JUKE_XX, IB_XXX, FIGS. 6A and 6C) representing information about the configuration of an audiovisual information reproduction device (100.1 to 100.*n*, FIG. 1). A first group of tables (IB_XXX) in the third set of arrays (1103, FIG. 6A) contains all operating parameters of the audiovisual information reproduction devices (100.1 to 100.*n*, FIG. 1) and a second group of tables (JUK_XXX) in the third set of arrays 1103 associates each jukebox with a given set of parameters contained in a table in the first group of parameters in the third set of arrays (1103, IB_XXX). Operating parameters include parameters controlling the volume of the amplifier defined for a jukebox in the table (JUK_MIXAGE, FIG. 6A), and also parameters defined for all jukeboxes in the (IB_MIRAGE, FIG. 6A) table or parameters about the price to be paid (IS and JUK_TUNE_COST, FIG. 6C) for each song selection, or telecommunication link parameters (JUK_ISP, FIG. 6C) with the server (10, FIG. 1), or operating parameters for a remote control if any for an audiovisual information reproduction device (100.1 to 100.*n*, FIG. 1). These parameters are defined for a jukebox in the (JUK_REMOTE_CONTROL, FIG. 6C) table and all remote control operating parameters for all jukeboxes are defined in the (IB_REMOTE_CONTROL, FIG. 6C) table, an audiovisual information reproduction device (100.1 to 100.*n*, FIG. 1) being associated each time with a table (JUK_TUNE_COST, IB_TUNE COST, JUK_REMOTE_CONTROL, IB_REMOTE_CONTROL, FIG. 6C) in the third sets of arrays 1103. Each row in a table stores operating parameters for an audiovisual information reproduction device (100.1 to 100.*n*, FIG. 1) with a given number (JUK_ID, FIG. 6A. The link between first and third sets of arrays 1103 may be made for example using the identification number of an audiovisual information reproduction device (100.1 to 100.*n*, FIG. 1). Thus, the server 10 can find all operating parameters of an audiovisual information reproduction device (100.1 to 100.*n*, FIG. 1) with a given number by using this link, by searching in each third set of arrays 1103 for tables containing the number (JUK_ID) of the determined audiovisual information reproduction device (100.1 to 100.*n*, FIG. 1), then searching in the rows of these tables for the set of parameters corresponding to the found reference. Similarly, the server can update the information contained in the third set of arrays 1103 when a message is received from a jukebox. This is done by the server processing the received message immediately that a jukebox enters into communication with the server, in order to determine if the information contained in the database needs to be updated. If the message contains information about modifications to physical parameters, the server adds a new table or replaces the value supplied by the modifications in the row of the table concerned in the third set of arrays 1103.

The first set of arrays (1101, FIGS. 5 and 6A) is also related to a fourth set of arrays (1104, SONG, FIGS. 5 and 6A) representing information about songs stored on the audiovisual information reproduction devices (100.1 to 100.*n*, FIG. 1). Each song is identified by a unique number (CLT_ID, FIG. 6A). Each row in a table in the fourth set of arrays 1104 represents a song stored on the audiovisual information reproduction device (100.1 to 100.*n*, FIG. 1) identified by its number (JUK_ID, FIG. 6A) at the beginning of the table. The server can update information contained in the fourth set of arrays 1104 when a message is received from a jukebox. In order to do this, as soon as a jukebox sets up a communication with the server, the server processes the received message to determine if the message contains information specific to the songs list, and to decide if the information contained in the database needs to be updated. If the message contains information about modifications to the list of songs contained in the jukebox, the server then adds a new table if the jukebox had not yet been registered, or modifies the row corresponding to the received modifications in the table corresponding to the jukebox, in other words either the deletion of one or several songs, or the addition of one or several new songs in the list of songs available on the jukebox.

A fifth set of arrays (1105, CATALOGUE, FIG. 6B) related to the fourth set of arrays (1104, SONG, FIG. 6A) through the song identification number (CLT_ID, FIG. 6A), comprises a description of each song in the database. Each table in the fifth set of arrays (1105, FIG. 6B) represents the description of a song in the database 11. This fifth table 1105 in particular is used to determine whether or not a song is available to be downloaded on an audiovisual information reproduction device (100.1 to 100.*n*, FIG. 1) at the request of an operator. In particular, a song is not available unless agreements have been made about copying and playing the song. If these agreements have not been made, the song is present in the database but is not available for downloading to a jukebox. The link between the first 1101 and the fourth 1104 sets of arrays is made through the number (JUKE_ID, FIG. 6A) of the audiovisual information reproduction device (100.1 to 100.*n*, FIG. 1). Thus, the server can initially determine the identification number (CTL_ID, FIG. 6A) of all songs stored in an audiovisual information reproduction device (100.1 to 100.*n*, FIG. 1) with a given number. Then, secondly, the server can in particular determine the name (CTL_SONG_NAME, FIG. 6B) of any song present on the audiovisual information reproduction device (110.1 to 100.*n*, FIG. 1), determined by its number (JUK_ID), through the link between the fourth 1104 and fifth 1105 sets of arrays.

The fourth set of arrays (1104, FIGS. 5 and 6A) is also related to a sixth set of arrays (1106, FIG. 6B) representing information about filters that an operator can use to prohibit downloading one or several songs determined by special groups of tables. The song (or songs) is identified by a first group of specific tables identified by the identification number of the song(s) (FLT_CATALOGUE, FIGS. 5 and 6B), or by a second group of specific tables identified by the artist's identification number of the song(s) (FLT_ARTIST, FIGS. 5 and 6B), or a third group of specific tables identified by the identification number of the company that published the song(s) (FLT_LABEL, FIGS. 5 and 6B), or by a fourth group of specific tables identified by the identification number of the category (FLT_CATEGORY, FIG. 6B) to which the song(s) belong. Each group of tables in a sixth set of arrays 1106 represents a given filter for a song, an artist, a disk publisher or a category. One of the (JUK_FILTER, FIGS. 5 and 6B) tables in the sixth set of arrays 1106 is also linked to the first set of arrays 1101 and comprises the description (JUK_DESC, FIG. 6B) of the filter assigned to each jukebox by the filter identification number (JUF_ID) that is associated with the given jukebox identifier (JUK_ID) in each table (JUKEBOX, 1101). The first array 1101 also includes an argument corresponding to the filter number (JUF_ID). Thus, the filter on a given jukebox is defined by searching in the sixth set of arrays 1106 for the table(s) containing the (JU-F_ID) for the filter. Similarly, an operator can assign the same filter number to one or several audiovisual information reproduction means (100.1 to 100.n, FIG. 1).

The first array (1101, FIGS. 5 and 6A) is also related to a seventh array (1107, FIG. 6A) representing information about operators of the audiovisual information reproduction devices (100.1 to 100.n, FIG. 1). In particular, this information comprises an operator identifier (OPE_ID, FIG. 6A) in the tables (OPERATOR, FIG. 6A). Each table in the eighth set of arrays 1108 corresponds to a given operator. The relation between the first 1101 and the eighth 1108 sets of arrays is created using the operator's identifier and passes through the (JUKEBOX_ LOCATION, FIG. 6A) tables that contain the (OPE_ID, JUK_ID, FIG. 6A) combination so that it is possible to work backwards to the device. Thus, in particular this relation is useful to determine the numbers of the audiovisual information reproduction devices (100.1 to 100.n, FIG. 1) for which a specific operator is responsible for the management.

The first set of arrays (1101, FIG. 6A) is also related to an eighth set of arrays (1108, FIGS. 6A and 6E) representing information about the log for an audiovisual information reproduction device (100.1 to 100.n, FIG. 1). This information actually represents all events that take place on each audiovisual information reproduction device (100.1 to 100.n, FIG. 1) and particularly, every time that a song is played, information is entered in the jukebox and each jukebox puts itself into relation with the server 10 at regular intervals in order to fill in a table in an eighth set of arrays (1108, PLAY_LOG, FIG. 6A). Similarly, every time that an amount of money is inserted into the audiovisual information reproduction device (100.1 to 100.n, FIG. 1), a new item of information is entered in the jukebox and all this information is received in another table (SYSTEM_LOG, FIG. 6A) in the database 11 on the server 10 belonging to the eighth set of arrays. In particular, the information collected in these tables is used to calculate fees to be paid to the artist singing the songs, and also to find out exactly what songs were played during a day, a week or a given period, on a determined audiovisual information reproduction device (100.1 to 100.n, FIG. 1). For example, information about fee calculations is centralized in a ninth set of arrays 1109 related to the eighth set of arrays 1108.

The first set of arrays (1101, FIGS. 5 and 6A) is also related to a tenth set of arrays (1110, FIG. 6F) representing information about instructions that will be sent to at least one determined audiovisual information reproduction device (100.1 to 100.n, FIG. 1). At least one table (INSTRUCTION_DEF, FIG. 6F) in the tenth set of arrays (1110, FIG. 6F) comprises a description of the instructions. Similarly, the relation between the first set of arrays 1101 and the tenth set of arrays (1110, FIG. 6F) is made using the identification number of the audiovisual information reproduction device (100.1 to 100.n, FIG. 1). Thus, all instructions intended for a determined audiovisual information reproduction device (100.1 to 100.n, FIG. 1) can be collected. For example, these instructions may be an update to at least one software (INS_SOFTWARE, FIG. 6F) installed on the audiovisual information reproduction device (100.1 to 100.n, FIG. 1), downloading of new songs (INS_CATALOGUE, INS_ALBUM, FIG. 6F) ordered by the operator of the audiovisual information reproduction device (100.1 to 100.n, FIG. 1), a modification of the operating parameters (INS_BUTTON, FIG. 6F) of the audiovisual information reproduction device (100.1 to 100.n, FIG. 1). This tenth set of arrays 1110 is systematically read by the server 10 when an audiovisual information reproduction device (100.1 to 100.n, FIG. 1) sets up a communication with the server 10 in order to verify whether or not the instructions stored in the eleventh tables 1111 are to be used by the audiovisual information reproduction device (100.1 to 100.n, FIG. 1) that has just set up a communication with the server 10.

With reference to FIG. 1 according to the invention again, the server also comprises an "Internet" site manager 12. The "Internet" site is used to build up a number of screens using information from the database so that an operator can use a computer 20, for example a personal PC computer equipped with a modem 21 and an "Internet" connection, to access functions available in these screens. In particular, the various screens can be used firstly to view information stored in the database and related to the operation of at least one audiovisual information reproduction device (100.1 to 100.n), and secondly to modify some settings of at least one audiovisual information reproduction device (100.1 to 100.n), and thirdly to modify the list of songs on at least one audiovisual information reproduction device (100.1 to 100.n).

In order to do this, the "Internet" site manager 12 communicates with the database 11, using requests so that the information displayed on the screens corresponds to information in the database 11. Secondly, requests sent by the site manager 12 may be provided to modify information in the database 11. For example, the requests used will be in the SQL language.

The "Internet" site manager 12 operates as follows. The manager 12 communicates using the TCP/IP communication protocol specific to Internet, with the server of an Internet service provider 14, through communication means such as modems 121, 141 connected to the telephone network. The service provider's server 14 enables an operator to display screens built up by the site manager 12 on the monitor of his computer 20, by sending a request to the manager 12 through the service provider's server 14 which replies by sending the necessary messages to display the screen or the information requested by the operator. Therefore, requests for information from the operator are firstly transmitted to the service provider's server 14, and are then sent to the manager 12 of the host server site 10.

Figures 2, 6A:
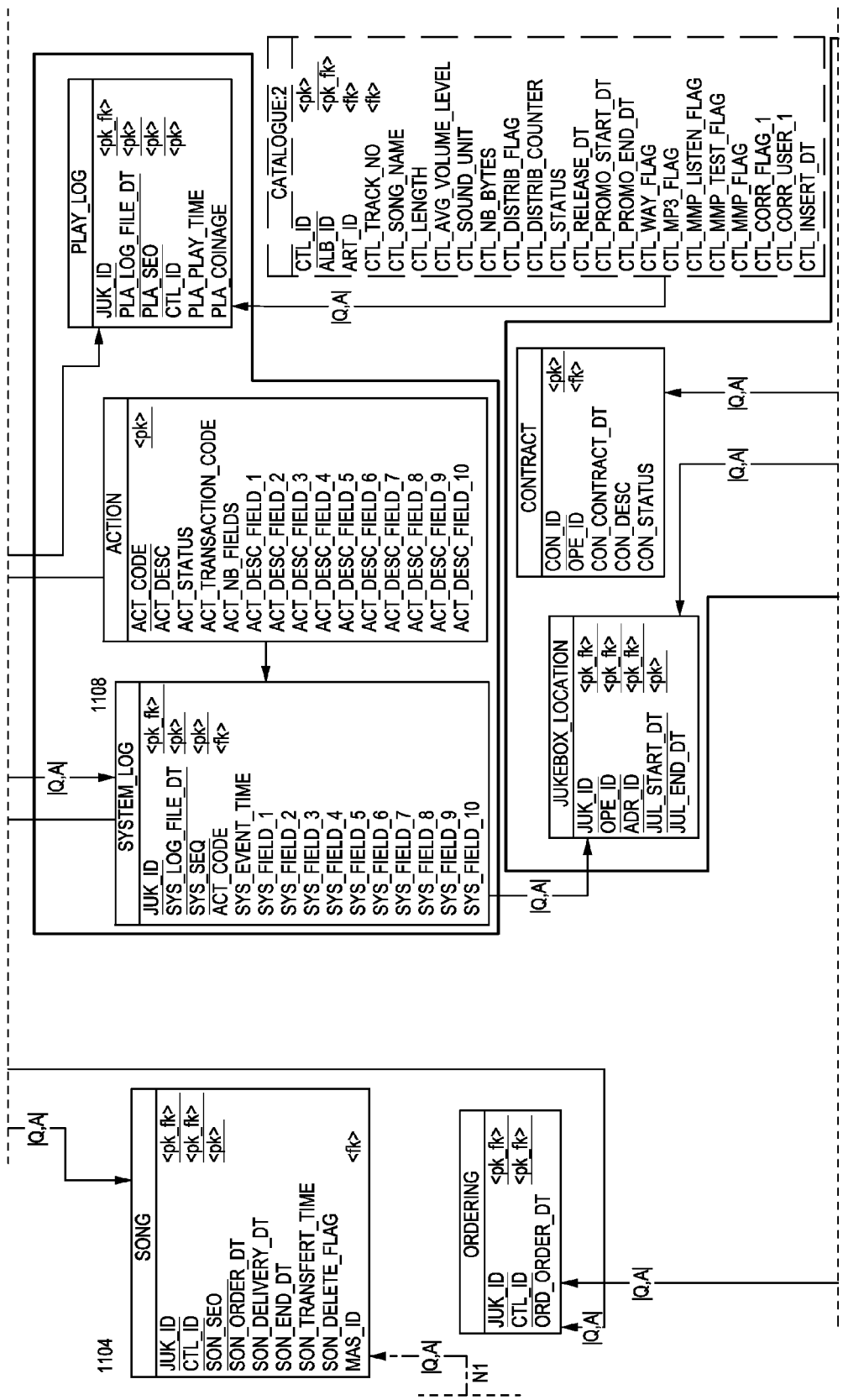
Figures 3, 6A:
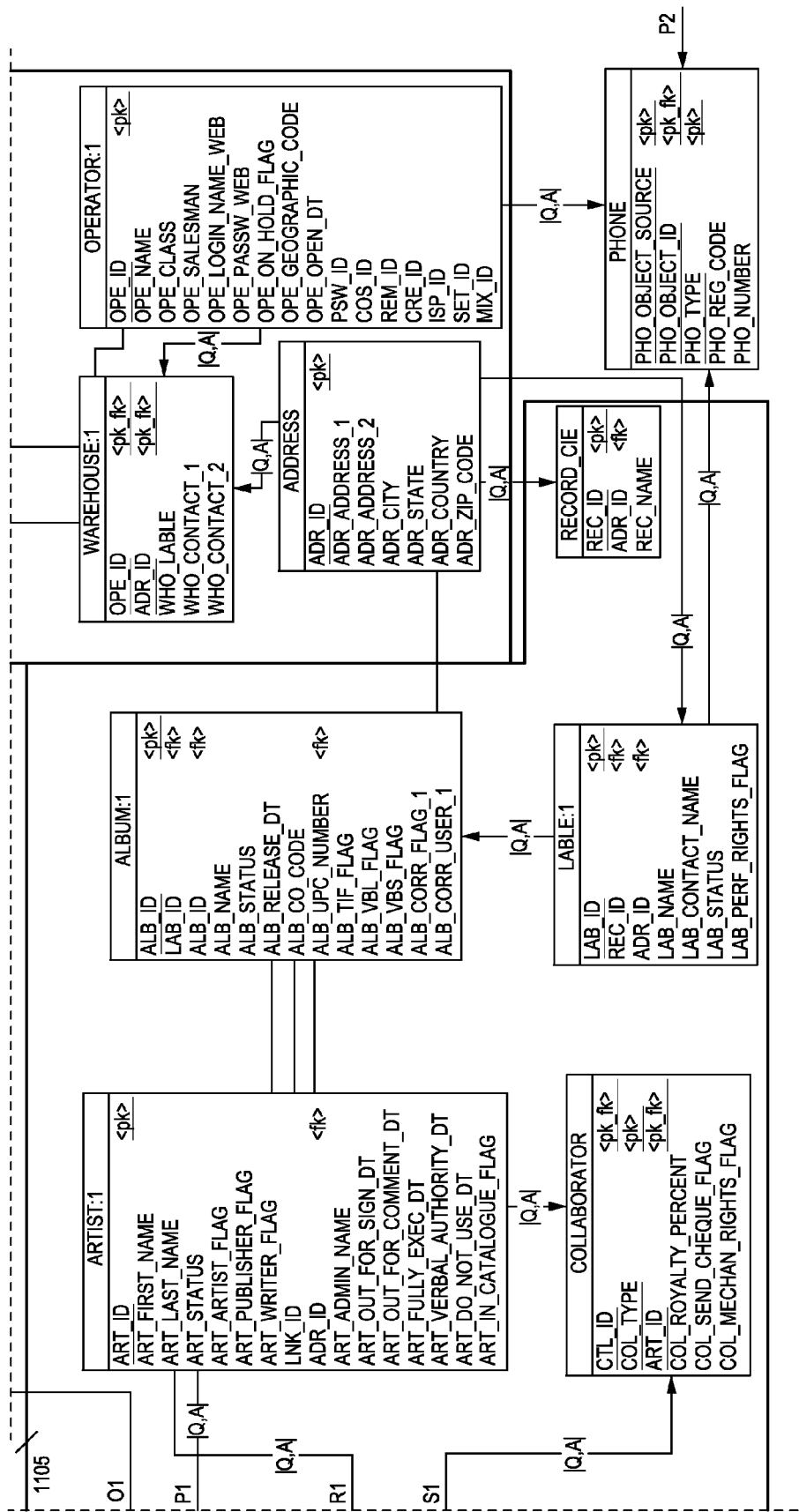
Figures 1, 6B:
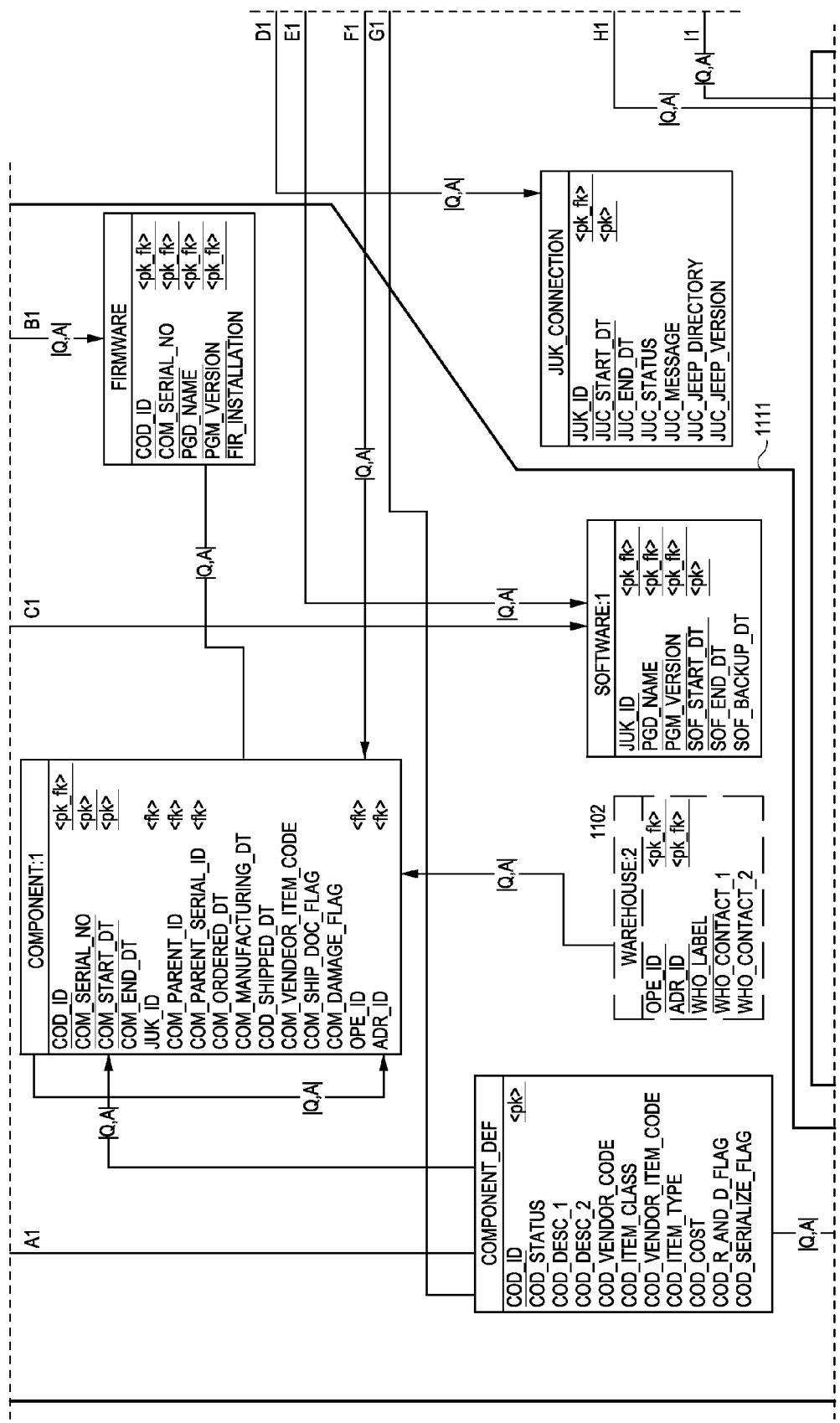
Figures 2, 6B:
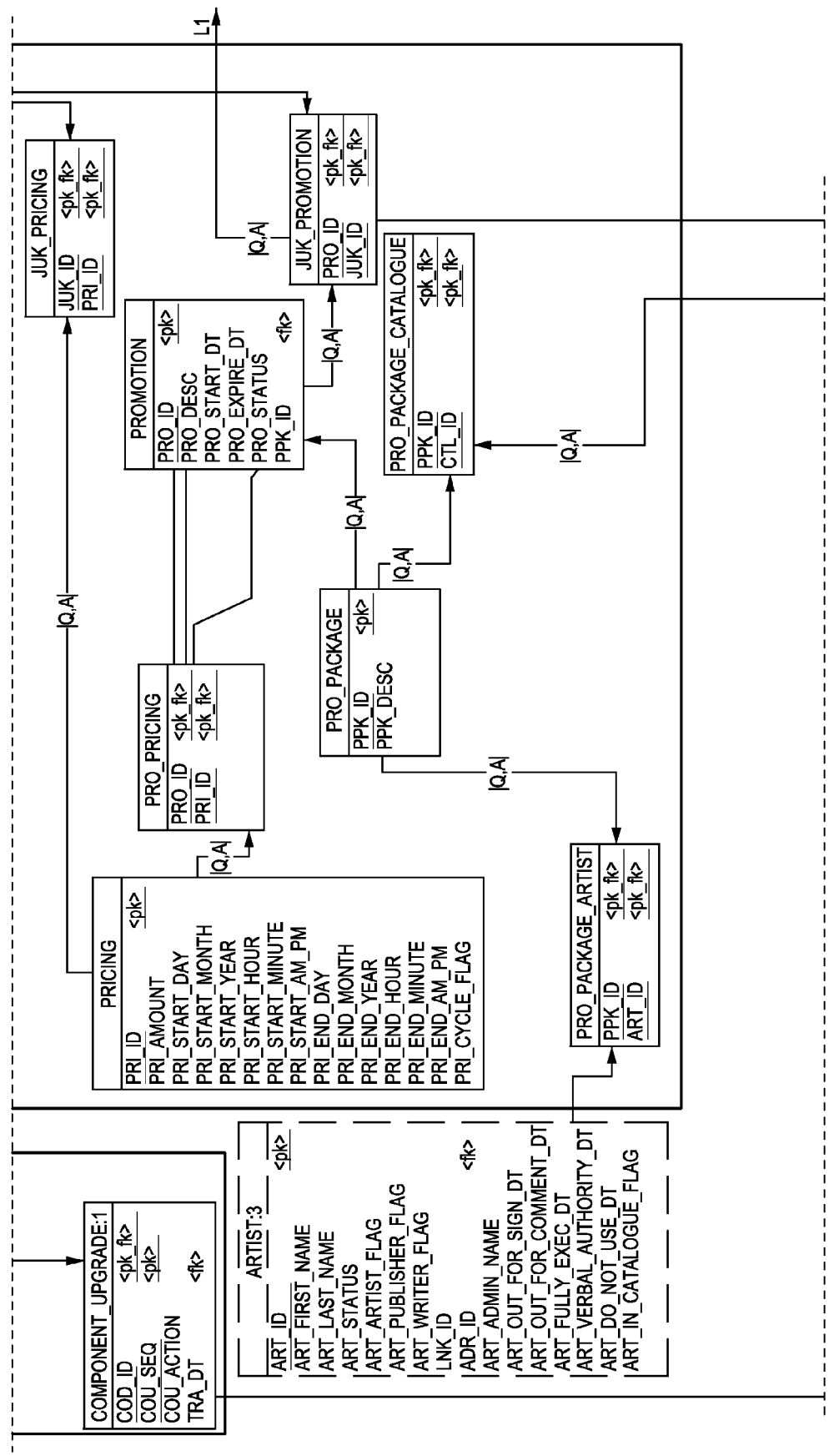
Figures 3, 6B:
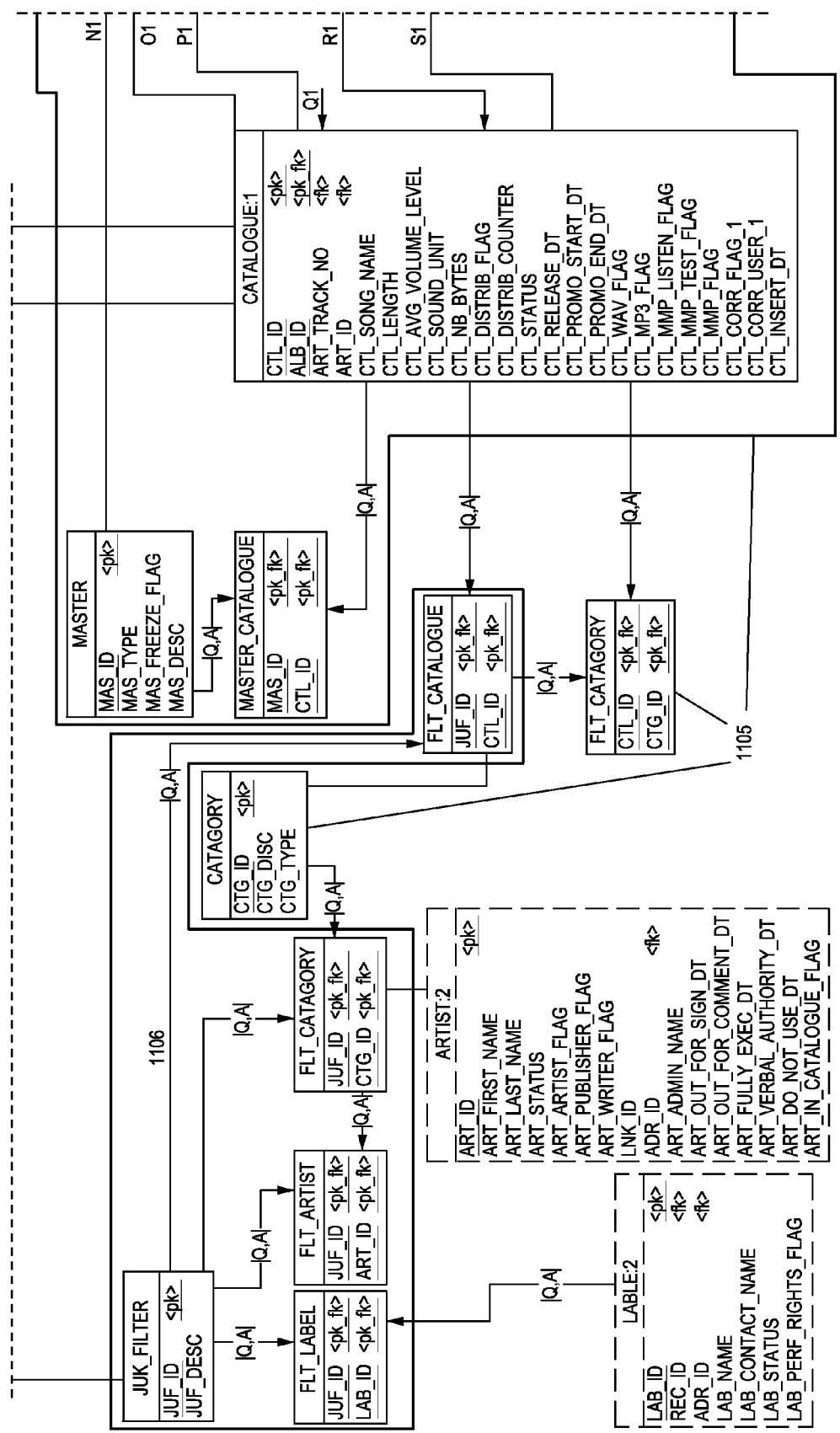
Figures 1, 6C:
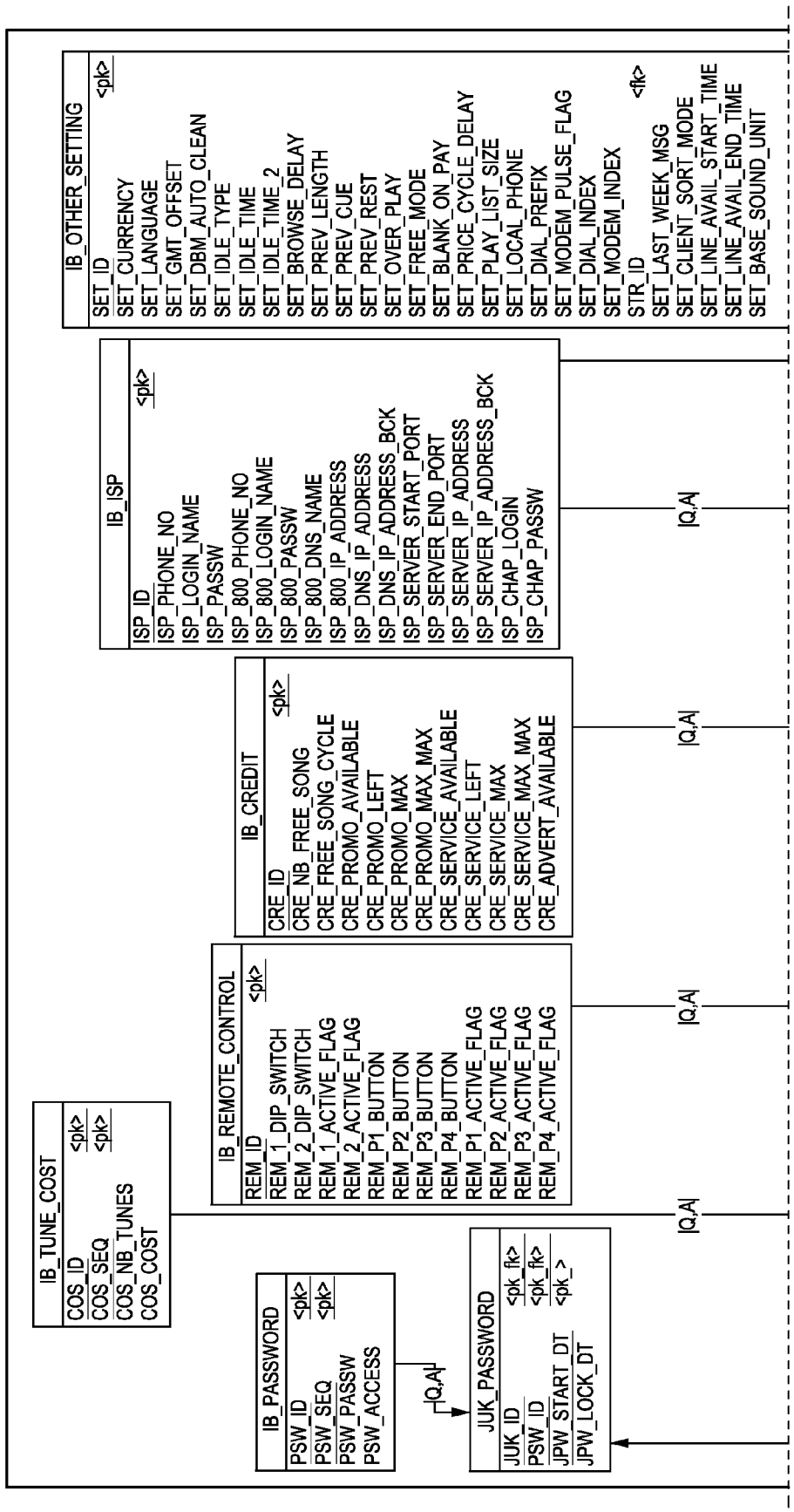
Figures 2, 6C:
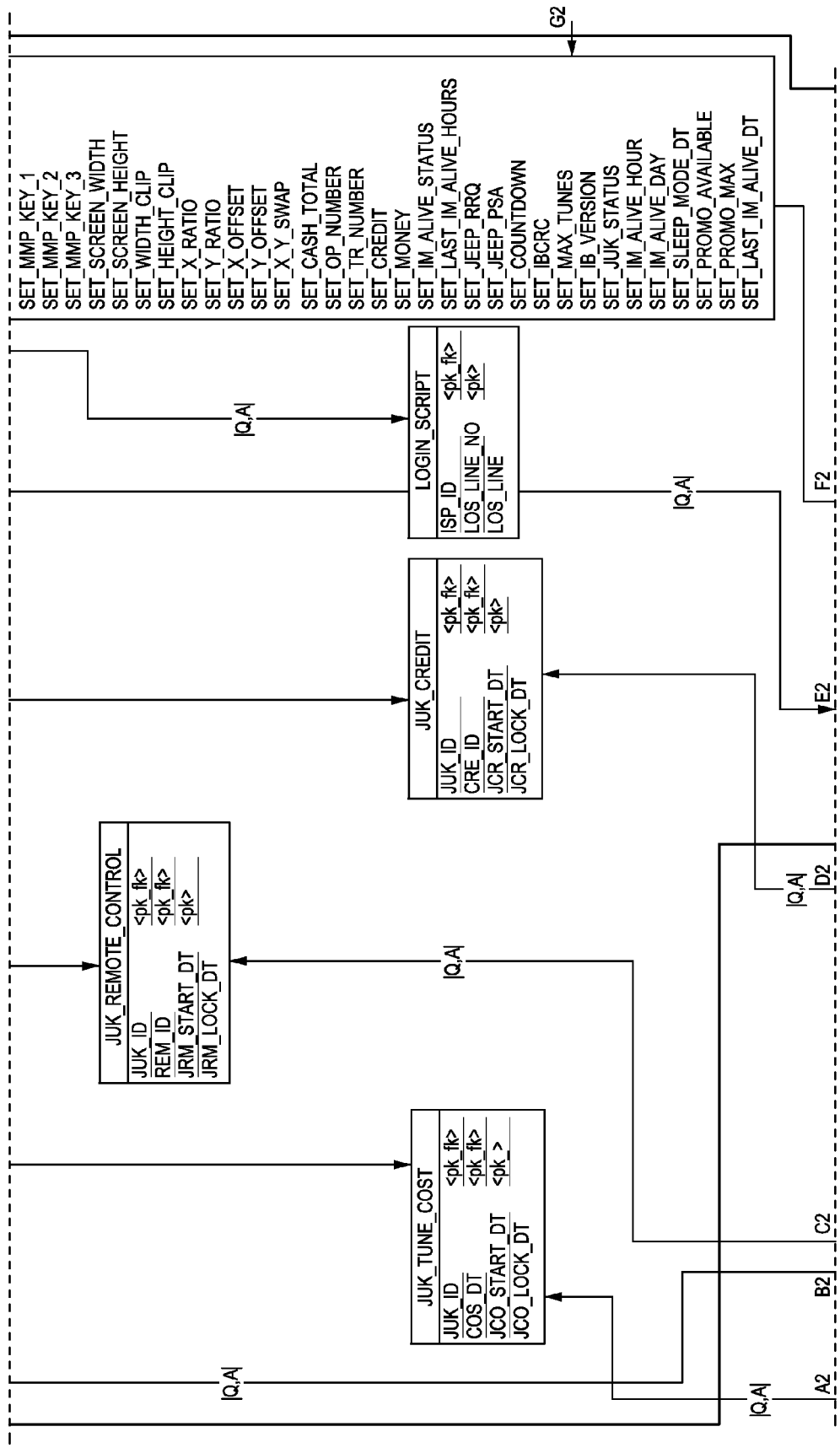
Figure 6D:
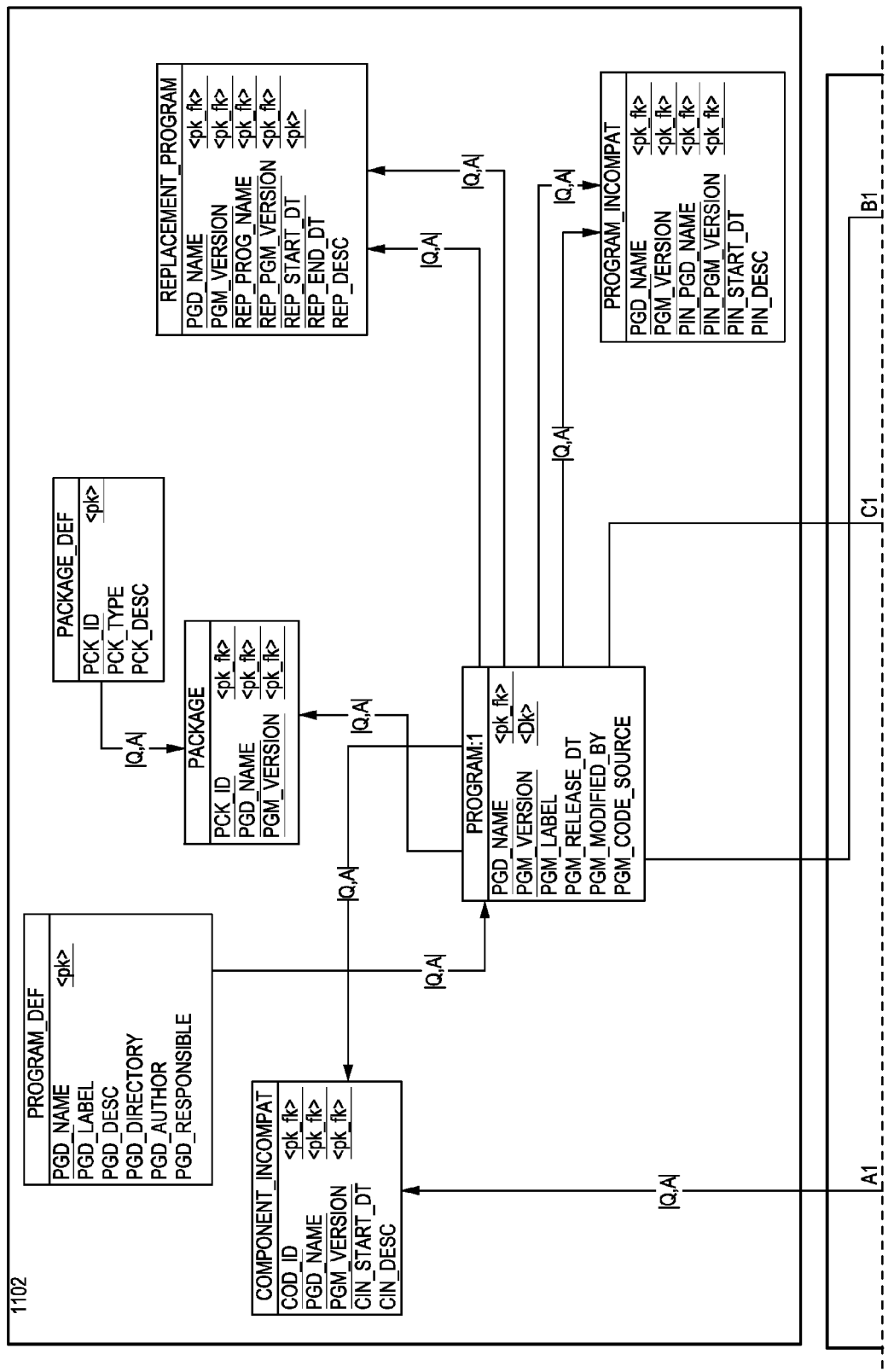
Figures 1, 6E:
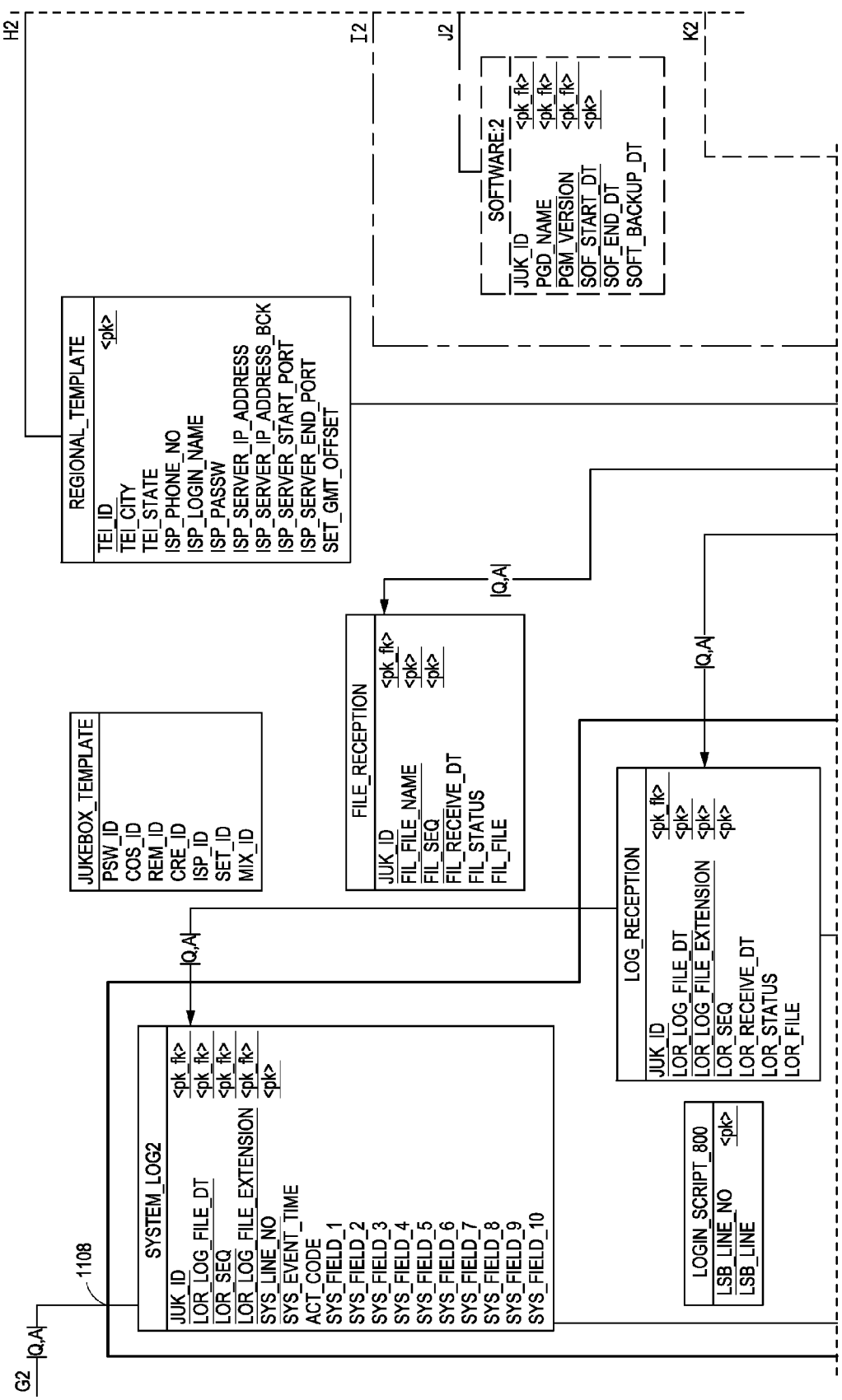
Figures 2, 6E:
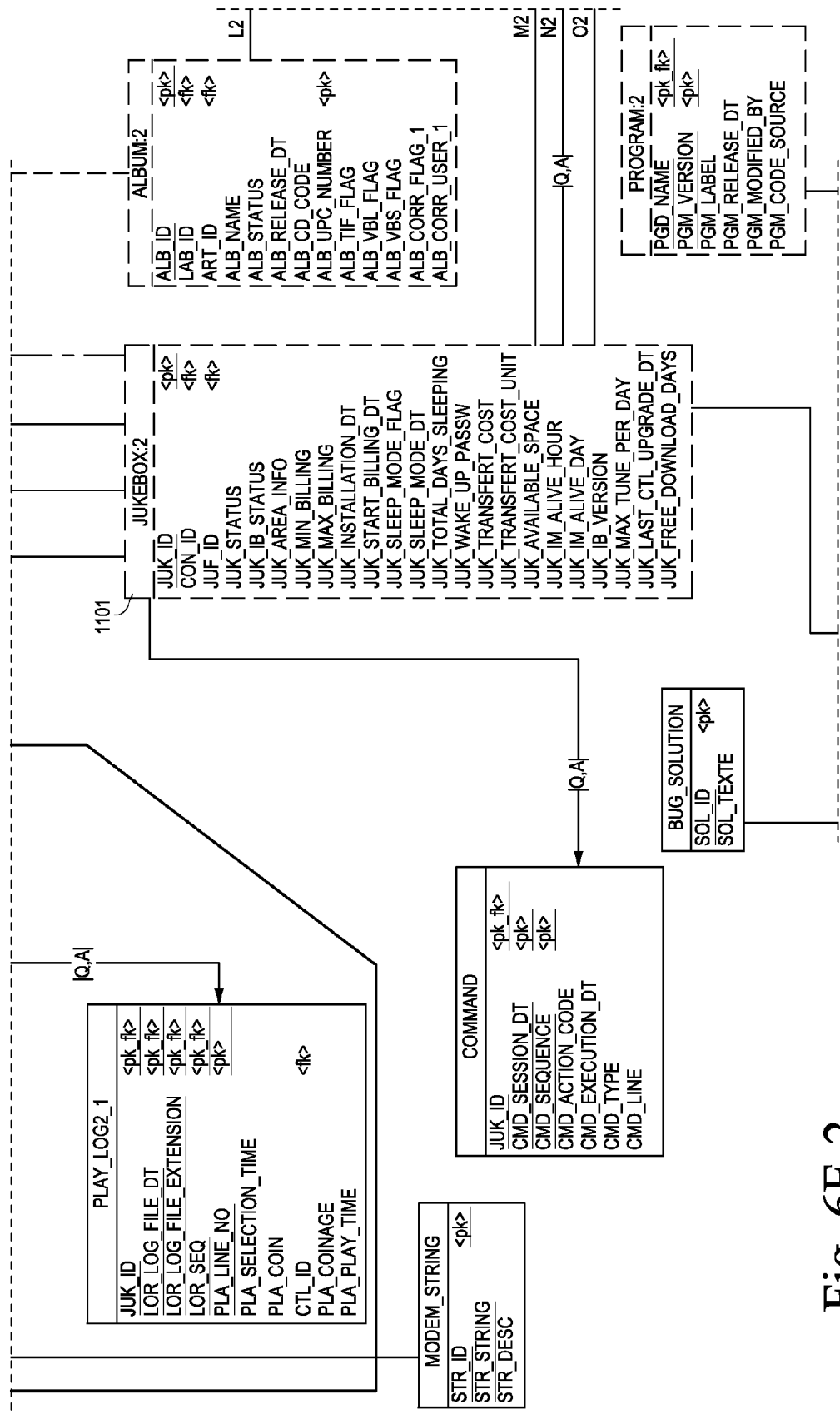
Figures 3, 6E:
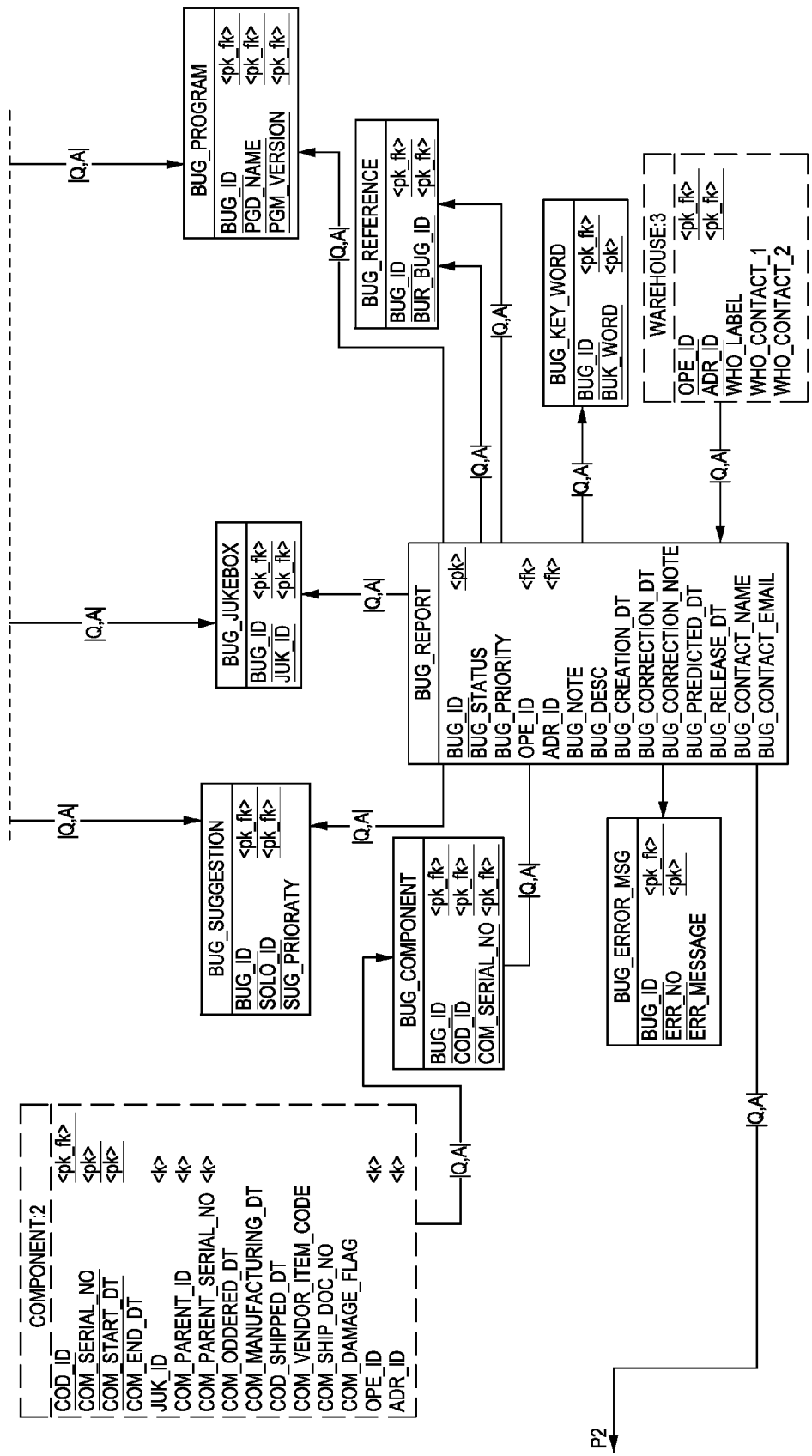
Figures 1, 6F:
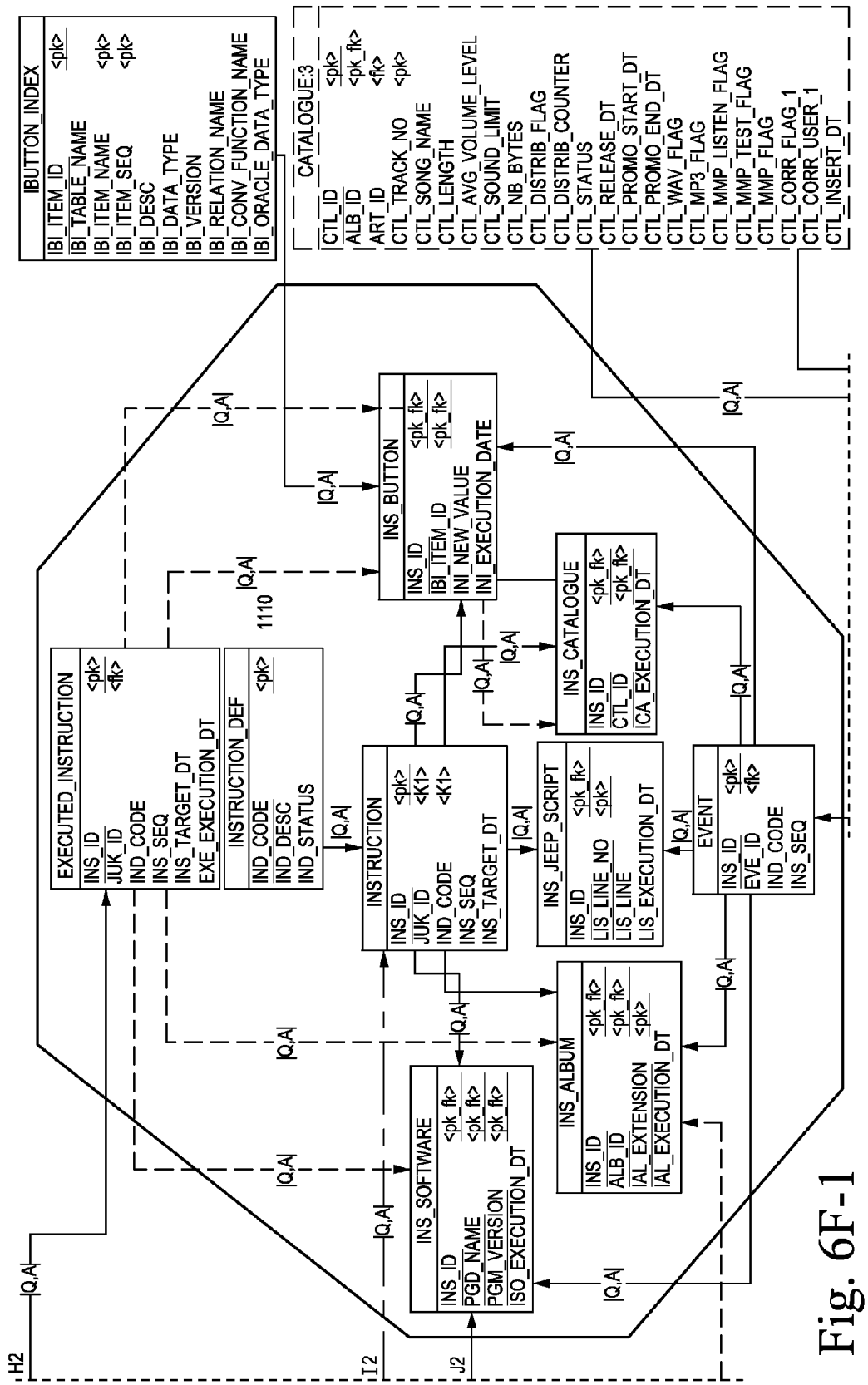
Figures 2, 6F:
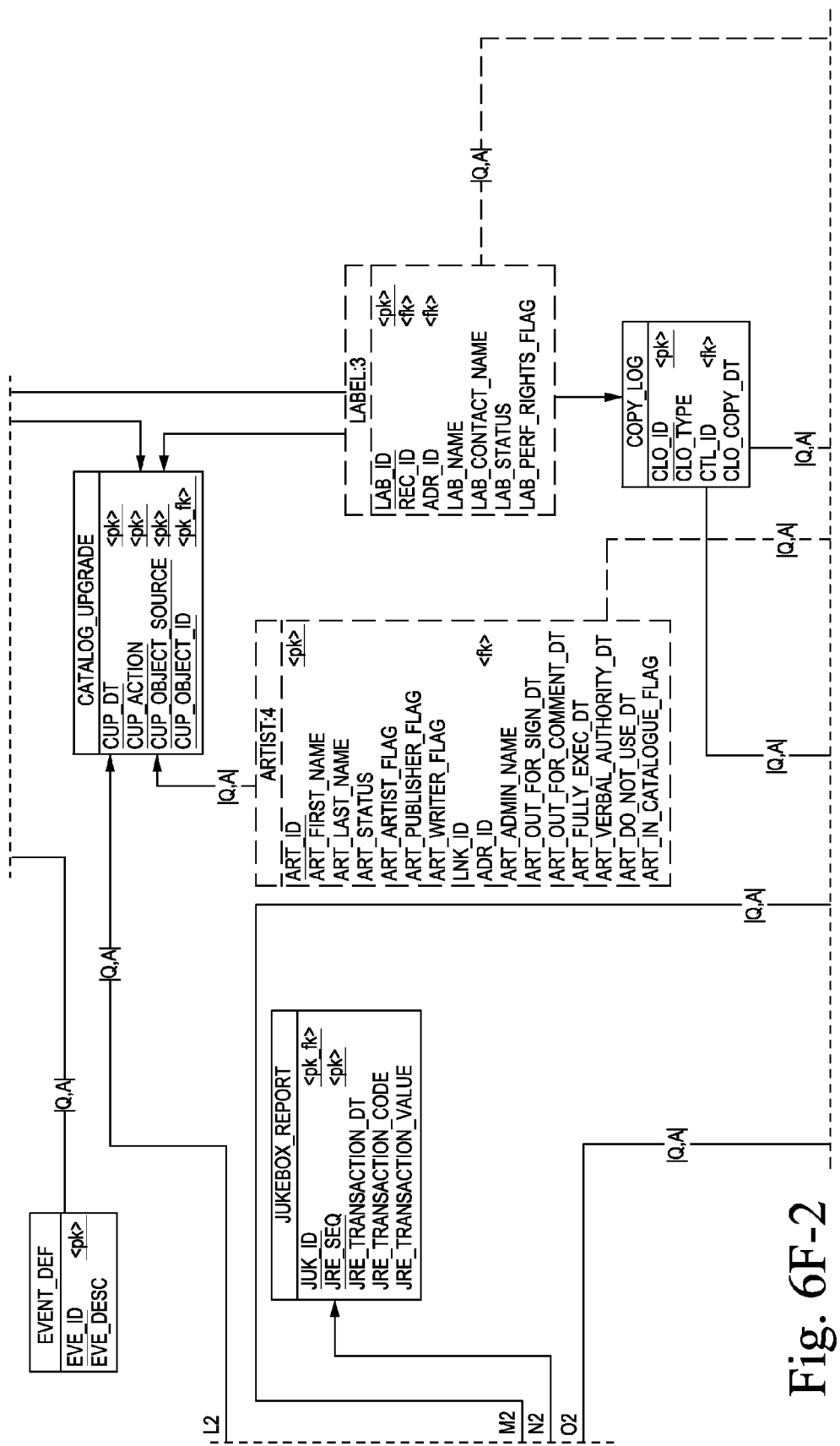
Figures 3, 6F:
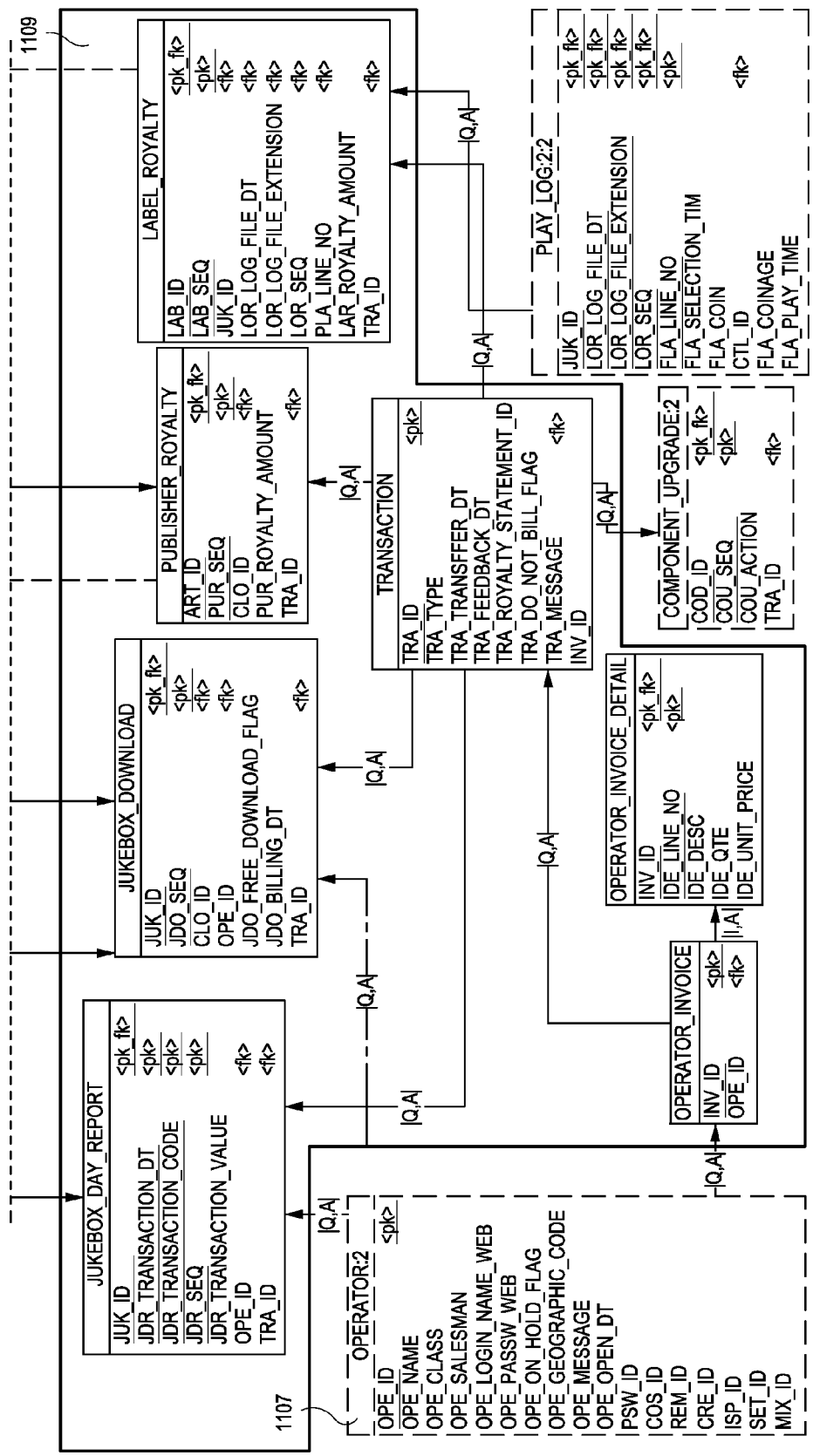

As soon as the operator accesses the "Internet" site through a request sent to the service provider's server 14, a first screen 200 shown in FIG. 2 is displayed on the operator's computer monitor 20. The display of this screen 200 is preceded by a query sent by the site manager 12 to the database 11. This query includes a request for the identification numbers of all audiovisual information reproduction systems (100.1 to 100.n) managed by the server 10. The database 11 processes this query by returning a list of all requested identification numbers. This processing consists of searching for the identification numbers of the audiovisual information reproduction devices (100.1 to 100.n) for which the identifier of the owner operator or renter of the audiovisual information reproduction devices (100.1 to 100.n) corresponds to the identifier of the operator who sent the request, by looking in the first set of arrays 1101. The manager 12 then builds up the first screen 200 by displaying the list obtained from the database 11 in a first window 201, that may for example be a popup window. Similarly, a second window 203 may be used to display a welcome message and/or information about the operator such as his address and the total number of jukeboxes that he manages. Information about the display on the screen 200 is then sent to the service provider's server 14, and the service provider then transmits this information to the operator's computer 20. Transfers of data between the host server 10 and the access supplier's server 14, and between the access supplier's server 14 and the operator's computer 20, may for example make use of modems 121, 141, 21, servers 10, 14 and the computer 20. The information received by the computer 20 is then used to display the requested screen.

Subsequently, all selection or input operations made on screens and displayed on the monitor 20 of the operator's computer are translated into queries using the HTTP protocol through the TCP/IP network to the service provider's server 14, and then to the site manager 12. The manager 12 processes this query, possibly by sending one or several queries to the database 11, for example in the SQL language, to build up a screen representative of the reply to the received query. This screen is then sent back to the computer monitor 20 belonging to the operator through the telephone network 30 and the service provider's server 14 using the HTTP protocol.

Figure 2A:
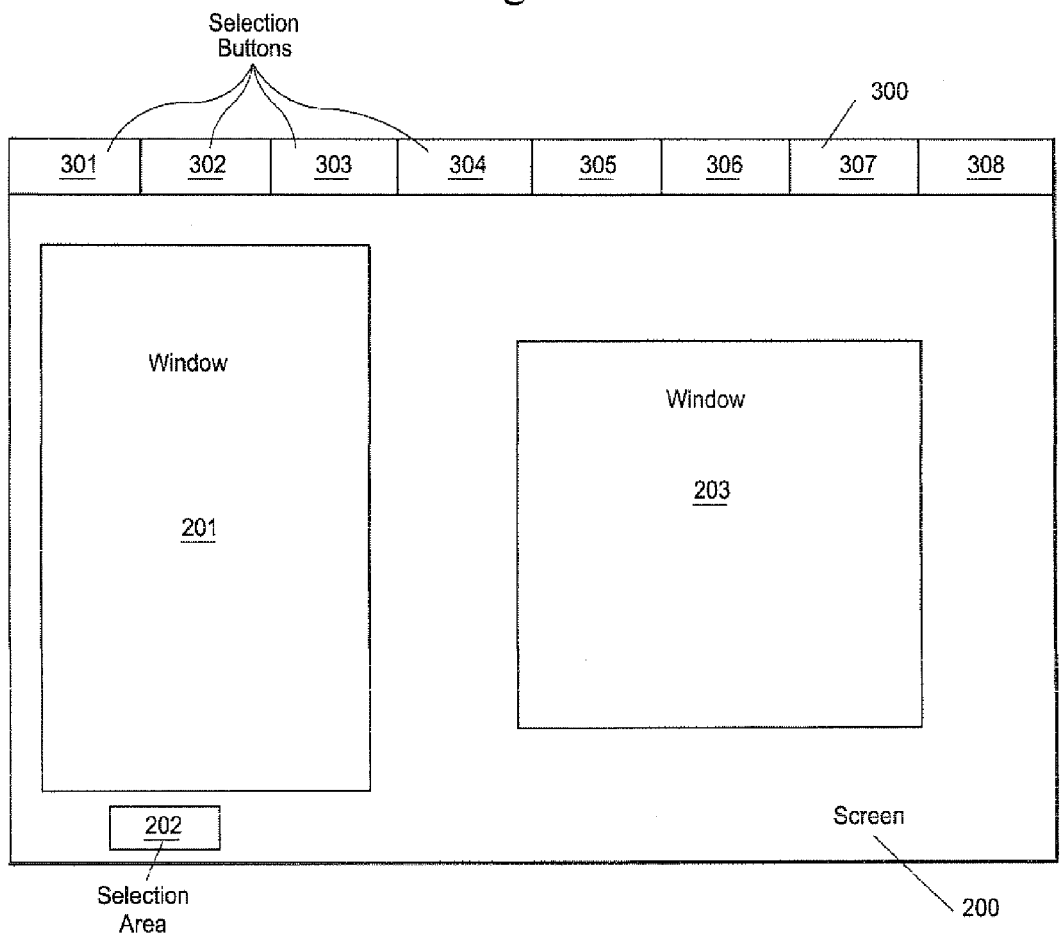
Figure 2B:
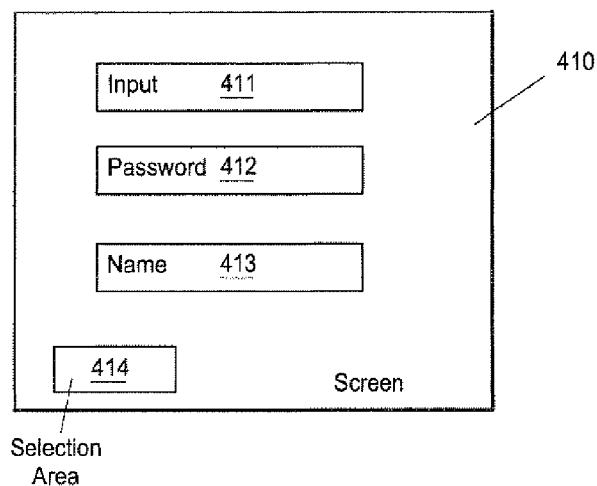

The display of the first screen 200 may be preceded by the display of a screen shown in FIG. 2B to authenticate the operator and to limit operator access. This screen 410 comprises at least one input area 411 to 413 in which the operator can input a password 412 and/or a user name 411. This screen 410 also comprises a selection area 414 that triggers sending an identification query containing elements input by the operator to the site manager 12. The site manager 12 processes this request, firstly by verifying the authenticity of elements input by the operator by comparing input elements and memorized values. For example, this verification may be made by viewing a selection of information contained in the seventh array (1107, FIG. 6A) about the operator, renter or owner of the audiovisual information reproduction devices (100.1 to 100.n, FIG. 1). Secondly, the site manager 12 sends a query to the database 11 containing the operator identification such that the database 11 only collects the number of the audiovisual information reproduction devices (100.1 to 100.n, FIG. 1) managed by the identified operator.

The operator then chooses the first screen 200 in the window 201, for example by selecting it using a pointer such as a mouse, or his finger on a touch screen, to choose the number(s) of the audiovisual information reproduction devices (100.1 to 100.n, FIG. 1) that he wishes to view or for which he wants to change the configuration. Once the selection has been made, the operator validates the selection either by selecting a first selection area 202 in the first screen 200, or by double clicking on the required jukebox number.

The first screen 200 and all other screens displayed by the "Internet" site manager 12, include a toolbar 300, for example in the upper part. This toolbar 300 comprises a number of selection buttons 301 to 308 that, when selected, trigger the display of a specific screen dedicated to carrying out the jukebox administration functions described above, or initiates validation of operations carried out on the current screen. Note that specific screens are displayed as a function of the jukebox(es) selected by the operator in the first window 209 in the first screen 200.

Thus, each selection button 301 to 308 in the toolbar 300 triggers a distinct query being sent to the site manager 12, then from the site manager 12 to the database 11. The query sent when the first selection button 301 is pressed is processed by the database 11 to collect settings for the selected audiovisual information reproduction device (100.1 to 100n) related to the selected jukebox installation. This information is then displayed in a third screen 400 shown in FIG. 2C. A first window 401 in this screen 400 comprises in particular the location of the jukebox, the name of the person responsible for the jukebox, and the type of music played on the jukebox. For example, the music type may be "rock", "country", "rhythm and blues", Latin music, "jazz", "alternative", or music related to seasonal events (for example Christmas carols). A second window 402 in the third screen 400 can be used to correct or modify the location or the manager's name. Two selection fields 403, 404 are then used to validate 403 or cancel 404 the modifications made. Selecting the validation field 403 will make the site manager 12 send a query to the database 11. This query is a modification query intended to update the data in the database 11 as a function of the input made by the operator on the third screen 400. When the database 12 receives this query, the database 11 also creates a file containing the updated information.

Selecting a second button 302 in the toolbar 300 makes the site manager 12 display a series of screens that the operator can use to choose at least one song that will be downloaded onto the audiovisual information reproduction device (100.1 to 100.n, FIG. 1) of his choice. This series of screens comprises a fourth screen 500 shown in FIG. 2D, enabling the operator to define a type of song. The song category is selected by selecting one or more areas (501.1 to 501.n) corresponding to the choice of the song type, for example using a pointer. The fourth screen may include several second fields (505.1 to 505.3) each defining each sort criterion for songs corresponding to the chosen type. For example, songs can be sorted by author 505.1, by album 505.2 or by song name 505.3. Similarly, a third field 506 can be used to display only songs that have been recently added into the database and that also satisfy other selection criteria. In another alternative, a fourth field 502 is used to choose, select or input one or several words that will be used to explore the songs database and to select songs in which the word(s) will be included, either in the title or in the name of the artist or in the title of an album.

The fourth screen 500 also comprises a selection area 503 triggering validation, and a selection area 504 triggering cancellation of the choices made by the operator and triggers the site manager 12 sending a query to the database 11. This query is processed by the database 11 to collect the names of all songs available in the database corresponding to selection criteria previously defined by the operator. In particular, the available songs are determined by reading the tables in the fifth set of arrays (1105, FIG. 5). The list of song names thus collected is transferred to the site manager that generates the list of available songs in the database 11, in other words songs that could be downloaded later onto the audiovisual information reproduction device (100.1 to 100.*n*) and satisfying the selection criterion chosen by the operator, into a popup window 507. For each song, the displayed data may for example be the song title, the artist's name, the title of the album from which the song was extracted, and/or a song identification number. For example, a song may be selected in the list in the first window by pointing at the required song name to highlight it, the choice of the highlighted song then being validated by pointing at a first selection area 508. Selection of this first selection area 508 triggers a procedure by the site manager 12 which, for example, displays a fifth screen 600 represented in FIG. 2E and displayed so that the choice of selected songs can be confirmed. This fifth screen 600 may comprise, for example, several fields (601.1 to 601.4) displaying the title 601.1 of the selected song, the title 601.2 of the album, the name 601.3 of the artist and the type 601.4 of music to which the song belongs. A first popup window 602 includes the list of jukeboxes belonging to the operator. This window 602 is used to choose the jukeboxes on which the song identified by the fields (601.1 to 604.4) will be downloaded. For example, one or more jukeboxes can be selected by pointing at the number of the jukebox(es) required by the operator in a first window 602. Selection of a first selection area 603 is a means of validating the choice of jukeboxes, and a second selection area displays a fourth screen again so that a new song can be selected.

In another variant, the query sent to the database 11 when the operator's choice is validated is processed by the database to collect the names of the songs most frequently played on the operator's other jukeboxes and/or on all jukeboxes managed by the server. Song names can also be selected respecting criteria chosen or selected by the operator.

After information in the database 11 representing the number of times each song has been played has been processed, a statistics program can be used to process audio or video film playing statistics and determine a classification, ignoring the type or category of establishment, or considering the type or category of establishment so that an operator of a similar category of establishment can be offered a list defined as a function of the classification. Thus, an operator with an establishment belonging to a determined category of establishments can request that the list of songs most frequently played on all jukeboxes installed in establishments in the same category be displayed on his terminal. As a non-restrictive example, the program performing this selection of songs is a product recommendation tool marketed by the Net Perception company.

Selection of the first selection area 603 triggers validation of the purchase of the song displayed in fields (601.1 to 601.4) for all jukeboxes highlighted in the first popup window 602 and makes the manager 12 send a request to the database 11. Processing of this query causes creation of a file containing the audiovisual information necessary to reproduce the songs selected by the operator on the audiovisual information reproduction devices (100.1 to 100.*n*) chosen by the same operator. This file or the information contained in it, is memorized and will be downloaded on the audiovisual information reproduction device (100.1 to 100.*n*, FIG. 1) concerned by the update as soon as this device sets up a telephone communication with the host server (10, FIG. 1). Downloading this file or information on audiovisual information reproduction devices (100.1 to 100.*n*, FIG. 1) causes the list of songs available on the audiovisual information reproduction devices (100.1 to 100.*n*, FIG. 1) to be updated, and also enables reproduction of songs corresponding to the audiovisual information contained in the file, on these audiovisual information reproduction devices (100.1 to 100.*n*, FIG. 1). For example, the information corresponding to this file is contained in one of the tables in the tenth set of arrays (1110, FIG. 6C) in the database 11. The next time that the audiovisual information reproduction device (100.1 to 100.*n*, FIG. 1) sets up a communication with the server 11, the server verifies in the tables in the tenth set of arrays (1110, FIG. 6C) to see if the instructions are intended for the audiovisual information reproduction device (100.1 to 100.*n*, FIG. 1) concerned. If so, the server 10 builds up a command file from the information contained in the corresponding table in the tenth set of arrays (1110, FIG. 6C) associated with the jukebox, and the server 10 then downloads this file to the audiovisual information reproduction device (100.1 to 100.*n*, FIG. 1).

In another variant embodiment of the invention, the songs ordered by the operator are not downloaded directly to the audiovisual information reproduction system(s) chosen by the operator, but are stored on a recordable optical medium such as a CD-ROM. The CD-ROM is then engraved with the audiovisual information corresponding to the songs chosen by the operator. The system according to the invention comprises a CD-ROM engraving system (not shown) for this purpose. Once the CD-ROM has been engraved, it is then sent, for example by mail, to the operator who can use it to update the audiovisual information reproduction devices (100.1 to 100.*n*, FIG. 1) that he manages. In order to limit the number of copies of the CD-ROM, the engraved information comprises the identification number of the audiovisual information reproduction devices (100.1 to 100.*n*, FIG. 1) on which the copy is authorized. The CD-ROM cannot be used unless a CD-ROM player is installed on each audiovisual information reproduction device (100.1 to 100.*n*, FIG. 1). During the operation to copy information contained on the CD-ROM, the operating system in the audiovisual information reproduction device (100.1 to 100.*n*, FIG. 1) compares the identification numbers contained on the CD-ROM and the identification number of the audiovisual information reproduction device (100.1 to 100.*n*, FIG. 1). If any of these numbers corresponds, the copy is made. If not, the copy is refused and the audiovisual information reproduction device (100.1 to 100.*n*, FIG. 1) may for example put itself out of service and setup communication with the server 10 to solve the problem. The choice between downloading songs or recording songs on a CD-ROM is made by selecting a fourth selection field (not shown) on the seventh screen or by displaying a special screen (not shown) after the operator has validated his choice of songs. This screen then comprises at least one selection area that can be used to choose between downloading or copying onto CD-ROM. In all cases, songs are compressed into the MPEG format and are encrypted and remain encrypted until they are executed on an audiovisual information reproduction device.

Copying on a CD-ROM is particularly useful when the operator would like to purchase a large number of songs and he wants to copy these songs onto several audiovisual information reproduction systems (100.1 to 100.*n*, FIG. 1). Downloading a large quantity of information can take a very long time and therefore be expensive in terms of telephone communications. Furthermore, when the communication takes a long time, there is an increased risk of an interruption and consequently all or part of the downloading will have to be restarted. This type of process can also be used for individuals acting as operators and ordering either by downloading or by an engraved CD-ROM, to obtain a selection of audiovisual tracks that remains encrypted depending on the identifier of the individual associated with the reproduction equipment and that can only be executed and decrypted when they are played on domestic devices like those described in the international patent application WO 96/12259 filed by the applicant and comprising decryption means using an identifier stored on the domestic device or in an associated device to decrypt the tracks.

The CD-ROM may be replaced by any portable magnetic or optical recording medium with an equivalent or greater capacity, for example such as a solid state electronic memory, for example a semi-conductor based.

Similarly, according to the process described above, the operator can create a hard disk in advance on which a list of required songs chosen by the operator is selected in advance, before a new jukebox is installed. When the jukebox is installed, the hard disk containing all chosen songs will be installed on the jukebox to form the mass memory means for the jukebox and the list of songs available on this jukebox.

Selection of the third button 303 in the toolbar 300 will cause a query to be sent towards the "Internet" site manager 12. The query is sent when the third selection button 303 is selected and is processed by the database 11 to collect the selected parameters for the audiovisual information reproduction device (100.1 to 100.n, FIG. 1) concerning information about the use of the jukebox chosen by the operator. This information is displayed in a series of fields (701.1 to 701.7) in the screen 700 shown in FIG. 2F. For example, a first field 701.1 indicates the date of the last call from the jukebox. A second field 701.2 indicates the execution status of the last call from the jukebox, in other words whether or not the call was successfully completed. A third field 701.3 indicates the operating state of the jukebox coin collector, if there is one. A fourth field 701.4 indicates the rejection rate of the coin collector. A fifth field 701.5 indicates the operating state of a jukebox bank note collector, if there is one. A sixth field 701.6 indicates the rejection rate of the bank note collector. A seventh field 701.7 indicates the date of the last maintenance or update operation of the jukebox.

A first popup window 702 on the sixth screen displays the list of songs to be downloaded on the jukebox. Selecting a first selection area 703 is a means of deleting one or several songs in the list and selected by the operator. A second popup window 704 on the sixth screen displays the list of songs that are to be deleted from the list of songs available on the jukebox. Selecting a second selection area 705 cancels the operation to delete one or several songs that the operator had previously selected. All information used to generate lists of songs displayed in the first and second popup windows 702, 704 in the sixth screen 700 is collected by the "Internet" site manager 12 in the database 11 on the server 10.

The "Internet" site manager 12 also displays information about usage statistics for an audiovisual information reproduction device (100.1 to 100.n, FIG. 1). For example, this display is triggered by selecting a fourth button 304 on the toolbar 300. Selecting a fourth button 304 causes the site manager 12 to send a query to the database. This query interrogates the database 11 about information related to usage statistics. The database 11 processes this request by collecting information of the type corresponding to the selected area. The collected information is displayed in a seventh screen 800 shown in FIG. 2G comprising several fields (801.1 to 801.3) each corresponding to a type of information. As a non-restrictive example, a first field 801.1 could correspond to the date of the last time that the coin collector and/or note collector on the jukebox was initialized. A second field 801.2 shows the amount of money put into the jukebox since the last time it was initialized. A third field 801.3 shows the amount of money put into the jukebox during the current week. The list of the 100 most frequently played songs on the jukebox (for example) is displayed in a first popup window 802 in the seventh screen 800. The list of the 100 least frequently played songs on the jukebox (for example) is displayed in a second popup window 803. A first selection area 804 is used to validate deletion of songs previously selected in the second window 803. The operator can use a second area 805 to cancel the choices that he had made of songs to be deleted. Selecting the first area 104 triggers validation of all choices made by the operator to delete songs and causes the site manager 12 to send a request to the database 11. This is a modifications query intended to update the data in the base 11 as a function of choices made by the operator on the seventh screen 800. When the database 12 receives this query, the database 11 also creates a file containing update information. This file or the information contained in this file is stored and will be downloaded onto the audiovisual information reproduction device (100.1 to 100.n, FIG. 1) concerned by the update as soon as it sets up a telephone communication with the host server 10. Downloading this file or this information onto the audiovisual information reproduction device (100.1 to 100.n, FIG. 1) will cause an update to the list of songs available on the audiovisual information reproduction device (100.1 to 100.n, FIG. 1) concerned in accordance with the operator's choice. For example, the information corresponding to this file is contained in one of the tables in the fourth set of arrays (1110, FIG. 6C) in the database 11. The first time that the audiovisual information reproduction device (100.1 to 100.n, FIG. 1) concerned sets up a communication with the server 10, the server checks in the tables in the tenth set of arrays (1111, FIG. 6C) to see if the instructions are intended for the audiovisual information reproduction device (100.1 to 100.n, FIG. 1) concerned. If so, the server 10 builds up a command file using the information contained in the table in the corresponding tenth set of arrays (1110, FIG. 6C), then the server 10 downloads this file to the audiovisual information reproduction device (100.1 to 100.n, FIG. 1).

The songs to be deleted are erased from the memory means in the audiovisual information reproduction device (100.1 to 100.n, FIG. 1).

The query sent when the fifth button 305 on the selection toolbar 300 is processed by the database 11 to collect the selected parameters from the audiovisual information reproduction device (100.1 to 100.n, FIG. 1) concerning the amount of money to be paid by the user of the audiovisual information reproduction device (100.1 to 100.n, FIG. 1), so that he can select at least one song on the audiovisual information reproduction device (100.1 to 100.n, FIG. 1). Similarly, volume adjustment parameters on the jukebox may also be collected. These parameters are then sent to the site manager 12 who then generates an eighth screen 900 shown in FIG. 2H, and containing a number of input areas (901, 902, 911I, 912I, 913, 914). A first series 901 of areas is used for the display of a price corresponding to the amount to be paid to select a given number of songs. This number is displayed in an area in a second series 902 of areas. The operator can modify each amount and each number of songs by pointing in the required input area. The eighth screen 900 also comprises third input areas (911.1 to 911.3) in which the operator can choose, select or enter sound volumes, and a fourth (912.1 to 912.3) input area in which the operator can control the jukebox bass and treble. A fifth area 913 is used to activate or deactivate a microphone that can be used with the jukebox and a sixth area 914 enables the operator to choose, select or enter the microphone sound volume. Finally, a seventh area 915 is used to activate or deactivate an auxiliary source and an eighth area 916 is used to select, choose or input the sound volume of this source.

The operator may, for example, validate all his inputs by selecting a first button 920, or he may cancel his inputs by selecting a second 921 button. Selecting the first cancellation button 920 cancels all choices, selections or inputs made by the operator who can then choose, select or input new parameters. Selecting the second validation button 921 makes the site manager 12 send a query to the database 11. This query requests modifications to update data in the base 11 as a function of input made by the operator on the eighth screen 900. When the database 12 receives this query, a file is also created in the database 11 containing update information. This file or the information contained in this file is stored and will be downloaded on the audiovisual information reproduction device (100.1 to 100.n, FIG. 1) concerned by the update, as soon as the device sets up a telephone communication with the host server 10. Downloading this file or this information onto the audiovisual information reproduction device (100.1 to 100.n, FIG. 1) will update the statuses of the particular functions of the audiovisual information reproduction device (100.1 to 100.n, FIG. 1) concerned in accordance with the operator's choice. The information corresponding to this file may, for example, be contained in one of the tables in the tenth set of arrays (1110, FIG. 6F) in the database 11. The next time that the audiovisual information reproduction device (100.1 to 100.n, FIG. 1) concerned communicates with the server 10, the server checks in the tables in the tenth set of arrays (1111, FIG. 6F) to see if the instructions are intended for the audiovisual information reproduction device (100.1 to 100.n, FIG. 1) concerned. If they are, the server 10 builds up a command file starting from information contained in the corresponding table in the tenth set of arrays (1110, FIG. 6F), then the server downloads this file to the audiovisual information reproduction device (100.1 to 100.n, FIG. 1).

In one variant embodiment, selecting a sixth button 306 in the toolbar 300 will display a ninth screen 1000 used to summarize all modifications that were made by the operator during the current connection. In order to do this, the ninth screen 1000 comprises a display window 1001, for example for each jukebox separately, displaying all modifications made. Thus, the operator can ensure that the modifications are conform with his requirements. This screen 1000 comprises a first selection area 1002 used to cancel the modifications, and a second selection area 1003 used to validate the modifications. In this variant embodiment, all queries sent to the "Internet" site manager 12 are sent during this final validation and not during selection of a particular area on each screen as described above.

Selecting a seventh button 307 on the toolbar 30 causes the site manager 12 to send a query to the database 11. This is an interrogation query which is processed by the database 11 to collect information about activation and deactivation of particular functions of the selected audiovisual information reproduction device (100.1 to 100.n, FIG. 1). For example, this information is collected in at least one of the third arrays (1103, FIGS. 6B and 6C) in the database 11. Once this information has been collected, the database 11 replies to the query from the site manager 12 that then builds up a tenth screen 1010 represented in FIG. 2J and containing a number of input areas (1011.1 to 1011.5) used to control activating or deactivating a particular function in the audiovisual information reproduction device (100.1 to 100.n, FIG. 1). A first function consists of deciding whether or not to authorize the use of a remote control to control operation of the audiovisual information reproduction device (100.1 to 100.n, FIG. 1). A second function consists of authorizing or not authorizing skipping over the song that is currently being played. A third function consists of authorizing or not authorizing successive repetition of the same song. A fourth function consists of authorizing or not authorizing the use of free credits on the audiovisual information reproduction device (100.1 to 100.n, FIG. 1).

The operator can modify the status of each function by modifying the display of input areas (1011.1 to 1011.5). The tenth screen 1010 also contains an area 1013 that cancels the modifications made and a selection area 1012 that validates the modifications made and will cause the site manager 12 to send a modification request to the database 11. When the database 12 receives this request, the information about the status of particular functions of the audiovisual information reproduction device (100.1 to 100.n, FIG. 1) will be updated, and the database 11 will also create a file containing update information. This file and the information contained in it, are stored and will be downloaded to the audiovisual information reproduction device (100.1 to 100.n, FIG. 1) concerned by the update as soon as the audiovisual information reproduction device sets up a telephone communication with the host server 10. Downloading this file or information onto the audiovisual information reproduction device (100.1 to 100.n, FIG. 1) causes the statuses of the particular functions of the audiovisual information reproduction device (100.1 to 100.n, FIG. 1) to be updated in accordance with the operator's choice. For example, the information corresponding to this file is contained in one of the tables in the tenth set of arrays (1110, FIG. 5) in the database 11. The next time that the audiovisual information reproduction device (100.1 to 100.n, FIG. 1) sets up a communication with the server 11, this server checks in the tables in the tenth set of arrays (1110, FIG. 6F) to see if the instructions are intended for the audiovisual information reproduction device (100.1 to 100.n, FIG. 1) concerned. If so, the server 10 builds up a command file starting from information contained in a corresponding table in the tenth set of arrays (1110, FIG. 6C), then the server 10 downloads this file to the audiovisual information reproduction device (100.1 to 100.n, FIG. 1) concerned.

Selecting an eighth button 308 in the toolbar 300 makes the site manager 12 display an eleventh screen (not shown). This eleventh screen comprises a number of windows that the operator uses to define a basic configuration for all or some of the selected audiovisual information reproduction devices (100.1 to 100.n). In particular, the various areas are used to define the type of graphic interface that will be displayed on the audiovisual information reproduction systems (100.1 to 100.n, FIG. 1), and operating parameters that will be installed by default on the selected audiovisual information reproduction systems (100.1 to 100.n, FIG. 1), such as the times at which the modem in the audiovisual information reproduction device (100.1 to 100.n, FIG. 1) will be available for making communications between the audiovisual information reproduction device (100.1 to 100.n, FIG. 1) and the server 10. The eleventh screen also comprises a selection area that validates the information input on the eleventh screen and triggers the creation and then sending a request from the site manager 12 to the database, 12. This request includes all information input by the operator on the eleventh screen. When the database 11 processes this request, an update file is created. This file or the information contained in it is memorized and will be downloaded on the audiovisual information reproduction systems (100.1 to 100.n, FIG. 1) concerned by the update as soon as the audiovisual information reproduction system sets up a telecommunication with the host server 10. Similarly, this file or information will be downloaded onto a new audiovisual information reproduction device (100.1 to 100.n, FIG. 1) managed by the operator the first time that the audiovisual information reproduction device (100.1 to 100.n, FIG. 1) gets into communication with the host server 10. Downloading this file or information onto an audiovisual information reproduction device (100.1 to 100.n, FIG. 1) will cause its configuration and operating parameters to be updated in accordance with the configuration defined by the operator on the eleventh screen. For example, the information corresponding to this file may be contained in one of the tenth arrays (1110, FIG. 6F) in the database 11. The next time that the audiovisual information reproduction device (100.1 to 100.n, FIG. 1) gets into communication with the server 11, this server reads the tenth tables (100.1 to 100.n, FIG. 1) to determine if the instructions are intended for the audiovisual information reproduction device (1110, FIG. 5). If they are, the server 10 builds up a command file making use of the information contained in the corresponding tenth arrays (1110, FIG. 6C), then the server 10 downloads this file to the audiovisual information reproduction device (100.1 to 100.n, FIG. 1).

When the operator selects several audiovisual information reproduction systems (100.1 to 100.n, FIG. 1) when the first screen 200 is displayed, either the screens described above will be displayed for each audiovisual information reproduction device (100.1 to 100.n, FIG. 1) in the selection, or the update operations will be used for all audiovisual information reproduction systems (100.1 to 100.n, FIG. 1) in the selection. For example, the choice between one of these possibilities can be made by displaying additional screens (not shown) asking the operator to input the numbers of the audiovisual information reproduction devices (100.1 to 100.n) to which the updates that have just been validated should be applied.

In general, management operations for audiovisual information reproduction devices (100.1 to 100.n) or operations for displaying information about the use of audiovisual information reproduction devices (100.1 to 100.n) made through different screens displayed by the "Internet" site manager 12 correspond at least to management and display operations available on each audiovisual information reproduction device (100.1 to 100.n, FIG. 1).

It can easily be seen that the system according to the invention facilitates all management and configuration operations carried out by operators on audiovisual information reproduction systems (100.1 to 100.n, FIG. 1) The operator no longer needs to visit the site on which each audiovisual information reproduction device (100.1 to 100.n, FIG. 1) is located. Similarly, when an operator manages several audio-visual information reproduction systems (100.1 to 100.n, FIG. 1) simultaneously, he can reconfigure all or some of his audiovisual information reproduction devices (100.1 to 100.n) in a single manipulation.

It is obvious that other changes that could be made by experts in the subject would lie within the framework of the invention.

What is claimed is:

1. A method for remotely managing at least one audio-visual information reproduction device connected to a central server, the central server comprising a database including, for each audio-visual information reproduction device, management information, available audiovisual information, and configurations of operating parameters, the method comprising at the central server:

when receiving a request by an operator responsible for managing at least one said audio-visual information reproduction device, selectively serving a plurality of display screens, at least one first display screen comprising a list of audio-visual information reproduction devices installed locally for which information relating to use is available;

enabling the operator to modify the operating parameters of one or more operator-selected locally installed audio-visual information reproduction devices displayed in the list;

upon a user modification to the operating parameters of the one or more operator-selected locally installed audio-visual information reproduction devices:

generating a file of modification commands by the server using information from the database;

sending to each said operator-selected locally installed audio-visual information reproduction device the file of modification commands;

causing the file of modification commands to be received and executed by each said operator-selected locally installed audio-visual information reproduction device;

determining whether instructions for updating data in the audio-visual information reproduction device are present in at least one group of tables in the database; and if instructions for updating data in the audio-visual information reproduction device are present, sending at least update instructions for the audio-visual information reproduction device from the server to the audio-visual information reproduction device.

2. The method according to claim 1, further comprising upon selection via the first display screen of one or more locally installed audio-visual information reproduction devices:

displaying one or more second display screens that enable the operator to select at least one song; and updating audio-visual information associated with each said operator-selected locally installed audio-visual information reproduction device by either (a) allowing the song to be played back on each said operator-selected locally installed audio-visual information reproduction device, or (b) disallowing the song to be played back on each said operator-selected locally installed audio-visual information reproduction device, wherein (a) or (b) is based on an operator selection.

3. The method according to claim 2, further comprising upon selection via the first display screen of one or more locally installed audio-visual information reproduction devices:

displaying one or more third display screens that enable the operator to adjust management information for each said operator-selected locally installed audio-visual information reproduction device; and causing the adjustment of the management information in each said operator-selected locally installed audio-visual information reproduction device.

4. The method according to claim 3, wherein the first, second, and third display screens each include a first user-operable element enabling the operations carried out on the screen currently being displayed to be verified.

5. The method according to claim 4, wherein the first, second, and/or third display screens include a second user-operable element enabling information relating to the installation of the audio-visual information reproduction device chosen by the operator to be displayed and updated if altered by the operator.

6. The method according to claim 4, wherein the first, second, and/or third display screens include a third user-operable element enabling the operator to define selection criteria for selecting audio-visual information, and further comprising:

collecting corresponding audio-visual information from the database by sending a request including the selection criteria input by the operator; and displaying the collected corresponding audio-visual information.

7. The method according to claim 4, wherein the first, second, and/or third display screens include a fourth user-operable element that, when actuated by the operator, causes the display of usage statistics of one or more information reproduction devices selected by the operator.

8. The method according to claim 7, wherein the usage statistics specify songs that are played the most and/or the least on selected audio-visual information reproduction devices.

9. The method according to claim 1, further comprising upon selection via the first display screen of one or more locally installed audio-visual information reproduction devices:
  displaying one or more third display screens that enable the operator to adjust management information for each said operator-selected locally installed audio-visual information reproduction device; and
  causing the adjustment of the management information in each said operator-selected locally installed audio-visual information reproduction device.

10. The method according to claim 1, further comprising collecting, via a module of the central server, information relating to the operation of each said audio-visual information reproduction device.

11. The method according to claim 1, further comprising:
  storing data representing operator-initiated modifications in a file;
  translating the data into a language of the database; and
  updating the database and each audio-visual information reproduction device for which a modification has been made based on the translated data.

12. The method according to claim 1, further comprising authenticating the operator prior to said enabling.

13. The method according to claim 1, further comprising receiving input from the operator regarding a price per zone for playback of a selected song.

14. The method according to claim 1, further comprising receiving input from the operator corresponding to a function of a selected one or more audio-visual information reproduction devices to be either activated or deactivated.

15. The method according to claim 1, further comprising receiving input from the operator corresponding to a default configuration of all or some of the audio-visual information reproduction devices managed by the operator.

16. The method according to claim 1, further comprising receiving input regarding a category of audio-visual information requested by the operator so that items in the category may be subsequent displayed to the operator.

17. The method according to claim 16, further comprising displaying the items in the category, the items being collected from the database from among the most played audio-visual information on all the jukeboxes of the operator or from among the most played audio-visual information on all the jukeboxes managed by the server or from among the most played audio-visual information on all the jukeboxes installed in establishments in a given category.

18. The method according to claim 1, further comprising displaying a list of songs played by one or more operator-selected the audio-visual information reproduction devices, along with a date on which each song was played.

19. The method according to claim 1, wherein the operating parameters of each audio-visual information reproduction device correspond to internal functions of each said audio-visual information reproduction device.

20. The method according to claim 19, wherein the operating parameters include a cost of each selection, sound settings, level of the microphone, authorization to use a remote controller, authorization to switch between selections during reproduction of a selection, authorization to use free credits, and activation/inactivation of internal functions of the audio-visual information reproduction device.

* * * * *